United States Patent [19]

Nygaard, Jr. et al.

[11] Patent Number: 4,554,632

[45] Date of Patent: Nov. 19, 1985

[54] METHOD AND APPARATUS FOR DETERMINING IF A DIGITAL VALUE LIES WITHIN A RANGE

[75] Inventors: Richard A. Nygaard, Jr.; Fredrick J. Palmer, both of Colorado Springs, Colo.

[73] Assignee: Hewlett-Packard Company, Palo Alto, Calif.

[21] Appl. No.: 392,980

[22] Filed: Jun. 28, 1982

[51] Int. Cl.[4] .............................................. G06F 9/00
[52] U.S. Cl. ................................................... 364/300
[58] Field of Search ... 364/200 MS File, 900 MS File, 364/300

[56] References Cited

U.S. PATENT DOCUMENTS 4,100,532  7/1978  Farnbach .............................. 364/481
4,404,542  9/1983  Thomas, Jr. .......................... 364/900

Primary Examiner—Gareth D. Shaw
Assistant Examiner—John G. Mills
Attorney, Agent, or Firm—Edward L. Miller

[57] ABSTRACT

An n-bit input value is partitioned into groups of most significant and least significant bits. Each group respectively describes integers J and K that comprise the input value; J and K need not each have the same radix. J and K are applied as addresses to respective Random Access Memories (RAM's). Each RAM is previously preloaded with information specific to the range or ranges to be detected, and each outputs respective J- and K-type information as a function of the applied J and K. The J- and K-type information is merged together and applied as an address to a third RAM whose output indicates which range, if any, the input value lies within. The output of the third RAM can be in either a bit-per-range format or a range-per-code format. The former is faster and accommodates arbitrary ranges, while the latter allows recognition of significantly more disjoint ranges at the expense of the extra time required for subsequent interpretation of the range code. Mixtures of the two types of ranges are possible using the range-per-code format.

20 Claims, 14 Drawing Figures

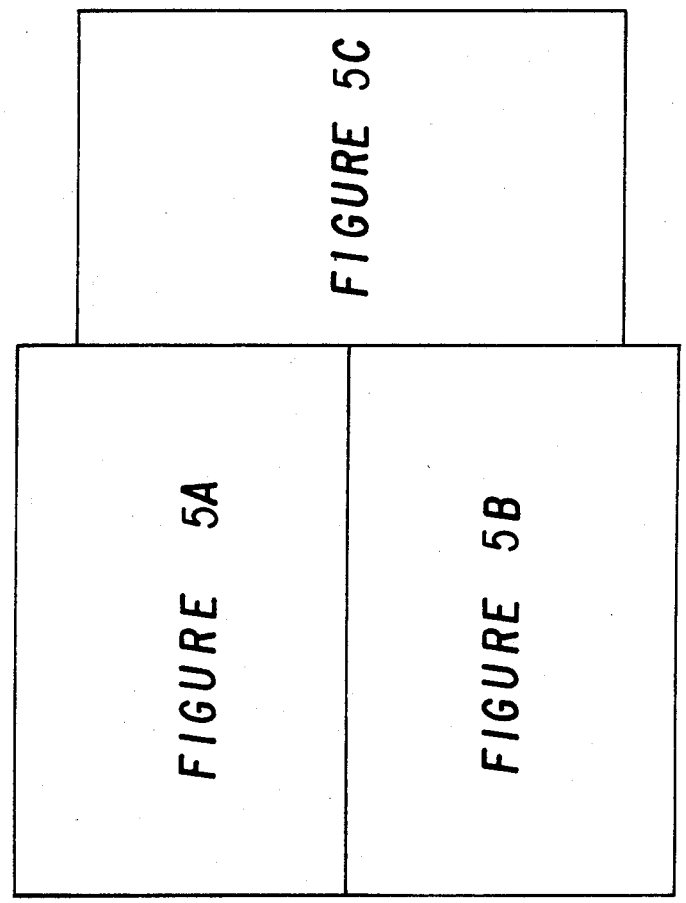

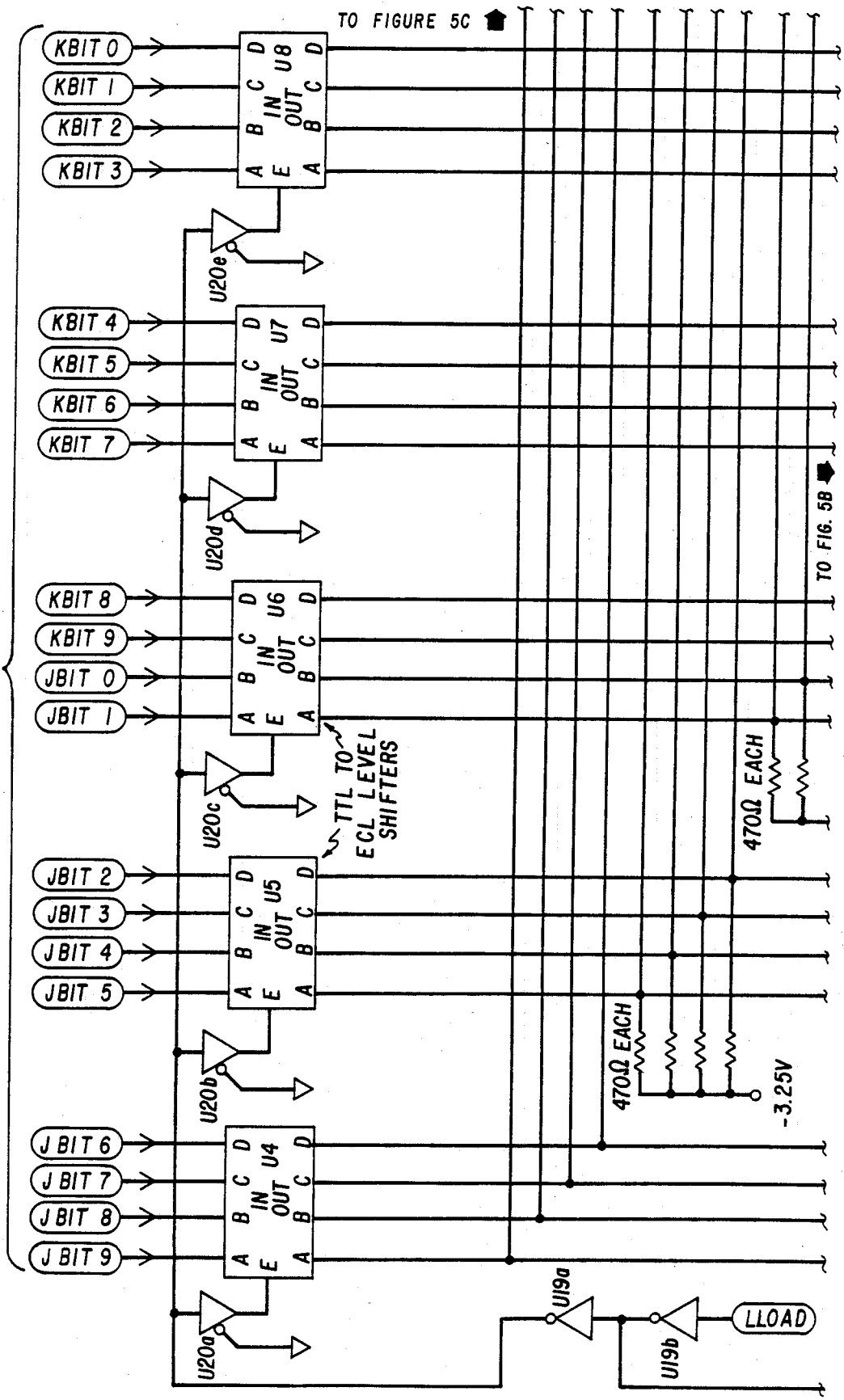

FIGURE 9

|   | v φ | χ ψ | ω |
|---|---|---|---|---|---|
| a | 0 | 0 | 0 | 0 | 0 |
| b | 1 | 1 | 1 | 1 | 1 |
| c | 1 | 1 | 1 | 1 | 1 |
| d | 0 | 0 | 0 | 0 | 0 |

ε

|   | v | φ | χ | ψ | ω |
|---|---|---|---|---|---|
| a | 0 | 0 | 0 | 0 | 0 |
| b | 1 | 1 | 1 | 1 | 1 |
| c | 1 | 1 | 1 | 1 | 1 |
| d | 0 | 0 | 0 | 0 | 0 |

δ

|   | v | φ | χ | ψ | ω |
|---|---|---|---|---|---|
| a | 0 | 0 | 0 | 0 | 0 |
| b | 1 | 1 | 1 | 1 | 1 |
| c | 1 | 1 | 1 | 1 | 1 |
| d | 1 | 1 | 1 | 1 | 1 |

γ

|   | v | φ | χ | ψ | ω |
|---|---|---|---|---|---|
| a | 0 | 0 | 0 | 0 | 0 |
| b | 0 | 0 | 0 | 1 | 1 |
| c | 1 | 1 | 1 | 1 | 1 |
| d | 1 | 1 | 1 | 1 | 1 |

β

|   | v | φ | χ | ψ | ω |
|---|---|---|---|---|---|
| a | 0 | 0 | 0 | 0 | 0 |
| b | 0 | 0 | 0 | 0 | 0 |
| c | 1 | 1 | 1 | 1 | 1 |
| d | 1 | 1 | 1 | 1 | 1 |

α

$1 \Rightarrow 237 \leq IJK \leq 854$
$0 \Rightarrow IJK$ NOT IN $R_{12}$

METHOD AND APPARATUS FOR DETERMINING IF A DIGITAL VALUE LIES WITHIN A RANGE

BACKGROUND OF THE INVENTION

In many digital logic applications, it is desirable to monitor a collection of digital signals and initiate an action or perform a particular function whenever a pattern appears which falls within a predetermined range of values. To serve this purpose, an apparatus must be provided which can test any given pattern in the monitored signals to determine if the pattern lies within the preselected range of values. Ideally, such an apparatus would provide fast operation, use of a minimum of parts, and be capable of checking a pattern against a number of ranges.

One prior approach in constructing a range testing apparatus is exemplified by U.S. Pat. No. 4,100,532, entitled *Digital Pattern Triggering Circuit* and issued to William A. Farnbach. This prior art scheme uses q-many memories to check an n-bit input pattern against a lower bound. Each memory has $2^{n/q} \times 2$ locations. One output bit indicates a partial greater than condition, while another represents a partial equality condition. The outputs of the memories are fed to a series of at least q-many gates, which determines if the tested pattern is greater in numerical value than a chosen lower bound. An analogous structure, using q-many more memories and gates, is used to check the pattern against an upper bound. The outputs of the two structures are fed to yet another gate which indicates whether the tested pattern is within the range defined by the upper and lower bounds. Thus, by using 2q memories and 2q+1 gates, an input value may be checked against a single range of consecutive numerical values.

One disadvantage of this approach is that only a single set of numerical values, delimited by an upper and lower bound, may be used as the predetermind range at any one time. While this may be sufficient for some applications, it is often desirable to check an input value against several ranges at once to enable different actions to be performed, depending on which range or combination of ranges contains the tested value. Since the Farnbach scheme can test against only one range at a time, several parallel structures, each using 2q memories and 2q+1 gates, must be used to test a pattern against multiple ranges.

Accordingly, it is an object of the present invention to provide a method and apparatus to check an input parameter against a range with a minimum of time and memory.

A further object of the invention is to accommodate an increase in the number of ranges without decreasing the speed of operation and with a minimal increase in the amount of memory required.

Another object of the invention is to accommodate arbitrary ranges defined with values having more bits than available memories have address bits.

Still another object of the invention is to allow a mix of arbitrary and disjoint ranges to be recognized, wherein for each arbitrary range not defined several disjoint ranges are definable in its place.

SUMMARY OF THE INVENTION

In accordance with a preferred embodiment of the invention described below an input parameter having an n-bit value is checked against one or more ranges. The ranges may be arbitrary and overlap each other as desired, or they may be disjoint, in which case it is possible to consider a comparatively larger number of ranges. The n-bit parameter is divided into a group of most significant bits describing an integer, say, J. The remaining least significant bits describe another integer, K. J and K need not have the same radix. J and K are applied as addresses to respective J and K Random Access Memories (RAM's). The J and K RAM's are each pre-loaded with information specific to the range or ranges to be implemented. This involves redefining the endpoints of each desired range in terms of integers having the same respective radices as for J and K. The information specific to the ranges may be thought of as J-types and K-types indicating such things as "the parameter must be in a certain range," "the parameter cannot be in a certain range," or, "the parameter might be in a certain range provided a selected condition is met." The J-type and K-type information is merged into an address for a third RAM that may be called an ID RAM. The ID RAM is loaded such that it responds to the various possible combinations of J- and K-types by producing an output indicative of which range the parameter lies within. The output may be called a range result code, and may have either of two formats called bit-per-range and range-per-code. In the bit-per-range format the range result code possesses a width in bits equal to the maximum number of ranges. A correspondence exists between the bit positions and the ranges. Each bit indicates whether or not the input parameter lies within the corresponding range. In the range-per-code format the q-many output bits from the ID RAM encode $2^q$ possible "range situations." These may include which of $2^q$ disjoint ranges the input value lies within. The particular value output by the ID RAM indicates which of the possibilities has occurred. Generally speaking, the bit-per-range format does not need further interpretation or decoding, while range-per-code might, depending upon how it is to be used.

A number of alternate embodiments are possible, although they are too numerous to discuss in any detail in this summary. The alternate embodiments are, however, fully described at appropriate places below. Generally, each involves the division of the input parameter into three or more portions, and different interconnections between the various RAM's.

BRIEF DESCRIPTION OF THE DRAWINGS

FIG. 5' is a map showing the relationship between FIGS. 5A–5C.

FIGS. 5A–5C comprise a partial schematic diagram of the block diagram of FIG. 2.

FIG. 9 is a memory loading diagram for a specific example range in connection with the block diagram of FIG. 8.

DESCRIPTION OF THE PREFERRED EMBODIMENT

Simplified Examples of the Principle

Figure 1:
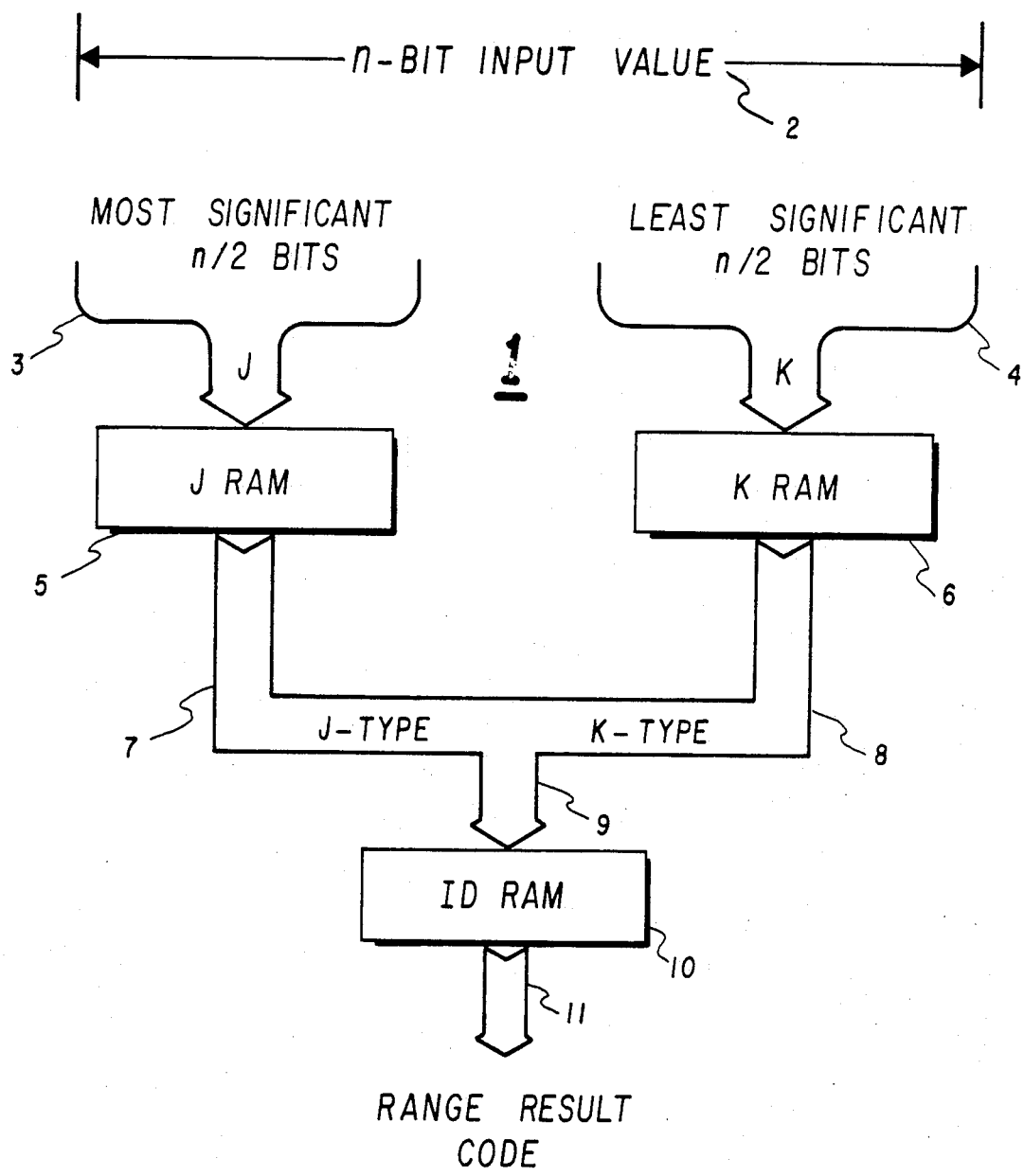
FIG. 1 is a simplified block diagram of a preferred embodiment of the invention, wherein the input parameter is split into two groups of bits each applied as addresses to RAM's whose output are then merged and applied as an address to a third RAM whose output is indicative of whether or not the input parameter lies within a predefined range.

Before proceeding with a full-blown technical description of the invention in all its detail, it may be helpful to sketch some simplified examples using the everyday numbers of the decimal system. The principle of the examples to follow now, as well as of those to follow later, is not compromised in the least through use of the decimal number system, even though that is uncommon in the hardware of modern digital apparatus. The specific number system used to originally describe the input value and the ranges to be checked is of no particular concern in the operation of the invention. But from the practical point of view of an easily understood explanation there are pedagogical reasons for avoiding hexadecimal and binary, both of which are common in the computer and microprocessor environment. The symbolic notation to be used in the explanation spreads across two alphabets, and conflicts with the conventional a–f used to denote six largest hexadecimal digits. Any confusing or ambiguous notation should be avoided. Binary, on the other hand, is not particularly compact and tends to make the examples appear cluttered and more complicated than they actually are. That leaves decimal and octal. Since everyone is familiar with decimal, and since there is no particular advantage to using octal, decimal notation was chosen for use in the examples. However, it should be borne in mind that the examples illustrate, in the abstract, the principles of the invention. In a particular application it is probable that an altogether different radix will be in use. No matter; in the end what is actually applied as addresses to the various memories are just so many binary bits, anyway. No particular radix has special properties upon which the principles of the invention depend, and the choice of decimal for the examples was based solely upon convenience.

Suppose, for example, that some two-digit parameter JK can assume any one of the one hundred integer values in the "value space" of zero-zero through nine-nine, inclusive. The initial task is to determine if a given parameter value falls within an arbitrary continuous subset of the assumable values; that is, within an interval of the ordered set of integers 0, 1, 2, . . . , 99. Say, for example, the subset of interest is the range $R_1$: $37 \leq JK \leq 54$. For this particular range, some values of J automatically disqualify the value of the parameter from being within the range, while at least one other ensures immediately that it is within the range. For example, there is no way JK can be in the range if J equals zero, one or two, and JK must be in the range if J equals four. The foregoing does not amount to a dichotomy, however. Consider J equal to either three or five. In those cases it is necessary to look at K, and to do so in light of the particular value of J. For if J is three then K must be seven or greater, while if J is five, K must be four or less.

For reasons that will become clear as this description proceeds, it is desirable to consider J and K separately (and as eventually shown below, simultaneously). How this may be done if the range is known in advance can be demonstrated as follows.

By knowing this particular range in advance, each possible value that J can assume can be classified as belonging to exactly one of four "J-types", each of which can be designated by one of four arbitrary symbols: a, b, c and d. That is:

If J equals:
 0, then J-type=a;
 1, then J-type=a;
 2, then J-type=a;
 3, then J-type=b;
 4, then J-type=c;
 5, then J-type=d;
 6, then J-type=a;
 7, then J-type=a;
 8, then J-type=a;
 9, then J-type=a.

Where J-type equal to:
 a means the parameter cannot be in range, K does not matter;
 b means the parameter might be in range, but only if $7 \leq K \leq 9$;
 c means the parameter must be in range, K does not matter; and
 d means the parameter might be in range, but only if $0 \leq K \leq 4$.

A moment's reflection will confirm that, for the present example, the different values that K can assume can each be uniquely associated with one of three "K-types", representable by the arbitrary symbols x, y, and z. For example, if K will be required to be $0 < K < 4$, there is no difference if K equals two instead of three. Accordingly:

If K equals:
 0, then K-type=x;
 1, then K-type=x;
 2, then K-type=x;
 3, then K-type=x;
 4, then K-type=x;
 5, then K-type=y;
 6, then K-type=y;
 7, then K-type=z;
 8, then K-type=z;
 9, then K-type=z.

Where K-type equal to:
 x means the parameter is in range provided J-type is c or d;
 y means the parameter is in range provided J-type is c; and
 z means the parameter is in range provided J-type is c or b.

It can now be appreciated that what are required are means to trade J for its type, means to trade K for its type, and means to see if the two types form certain combinations. The function of the latter means is summarized below in Table I. For certain combinations the parameter is in the range, while out of it for the others.

TABLE I

Combinations of J and K types versus whether the parameter is in or out of the range $R_1$.

|   | x   | y   | z   |
|---|-----|-----|-----|
| a | OUT | OUT | OUT |
| b | OUT | OUT | IN  |
| c | IN  | IN  | IN  |
| d | IN  | OUT | OUT |

It will also be appreciated that some means are required to adjust the J and K trading means so that they reflect the particular desired range. It should be noted, however, that such an adjustment means is, by itself, sufficient for responding to all instances of single continuous ranges, and that the relationship depicted in Table I is a general case that need not be changed if there is but one range that is of interest.

The above first simplified example illustrated a technique for determining if an input parameter value lies within an arbitrary range of a value space. A second simplified example presented below extends the technique to perform a somewhat different task. Let the value space be partitioned into, say, four adjacent disjoint ranges whose union is the original value space. Now the task is to identify the portion of the partition to which the input parameter value belongs. Assuming the same value space, let the four ranges of the partition be as defined below.

$PR_1$: $00 \leq JK \leq 36$
$PR_2$: $37 \leq JK \leq 54$
$PR_3$: $55 \leq JK \leq 59$
$PR_4$: $60 \leq JK \leq 99$ We now proceed with much the same classification of J and K as before. However, note that the specific meanings of the various type identifiers, as well as the number needed thereof, are different in this second example than in the first example. Here are the different types associated with J:

If J equals:
 0, then J-type=a;
 1, then J-type=a;
 2, then J-type=a;
 3, then J-type=b;
 4, then J-type=c;
 5, then J-type=d;
 6, then J-type=e;
 7, then J-type=e;
 8, then J-type=e;
 9, then J-type=e.

Where J-type equal to:
 a means the parameter must be in $PR_1$, K does not matter;
 b means the parameter
  might be in $PR_1$, but only if $0 \leq K \leq 6$; or
  might be in $PR_2$, but only if $7 \leq K \leq 9$;
 c means the parameter must be in $PR_2$, K does not matter;
 d means the parameter
  might be in $PR_2$, but only if $0 \leq K \leq 4$; or
  might be in $PR_3$, but only if $5 \leq K \leq 9$; and
 e means the parameter must be in $PR_4$, K does not matter.

Note that $PR_3$ is "simple" compared to, say, $PR_2$, in that $PR_3$ requires fewer J-types. The reason for this is that $PR_3$ is not "wide enough" to include an entire value of J that lies wholly within the interval. That not only obviates the need for a J-type for $PR_3$ corresponding to c for $PR_2$, but a single type d for $PR_3$ does not work of both types b and d for $PR_2$. If $PR_3$ and $PR_4$ were $55 \leq J \leq 75$ and $76 \leq JK \leq 99$ instead, then J-types a-g would need to be defined.

To proceed with the second example, here is how the various K-types are defined.

If K equals:
 0, then K-type=x;
 1, then K-type=x;
 2, then K-type=x;
 3, then K-type=x;
 4, then K-type=x;
 5, then K-type=y;
 6, then K-type=y;
 7, then K-type=z;
 8, then K-type=z;
 9, then K-type=z.

Where K-type equal to:
 x means the parameter is in
  only $PR_1$, provided J-type is a or b,
  only $PR_2$, provided J-type is c or d,
  only $PR_3$, never, and
  only $PR_4$, provided J-type is e;
 y means the parameter is in
  only $PR_1$, provided J-type is a or b,
  only $PR_2$, provided J-type is c,
  only $PR_3$, provided J-type is d, and
  only $PR_4$, provided J-type is e; and
 z means the parameter is in
  only $PR_1$, provided J-type is a,
  only $PR_2$, provided J-type is b or c,
  only $PR_3$, provided J-type is d, and
  only $PR_4$, provided J-type is e.

Table II shows the various combinations of J and K types that identify the different ranges within the partition of the value space.

TABLE II

Identification by J and K types of the ranges $PR_1$-$PR_4$ within a partition of a value space.

|   | x      | y      | z      |
|---|--------|--------|--------|
| a | $PR_1$ | $PR_1$ | $PR_1$ |
| b | $PR_1$ | $PR_1$ | $PR_2$ |
| c | $PR_2$ | $PR_2$ | $PR_2$ |
| d | $PR_2$ | $PR_3$ | $PR_3$ |
| e | $PR_4$ | $PR_4$ | $PR_4$ |

A true partition, such as in the above second example, can also be used to detect a plurality of arbitrary overlapping ranges. Regardless of the nature of the ranges, they form a partition of the value space when they are "merged" by projecting each endpoint onto a single line representing the value space. The resulting partition may have more cells than there were original ranges, particularly if many of the range endpoints were distinct. Likewise, the number of cells in the partition could be less than the number of original ranges if some or all of the ranges have common endpoints. Regardless of that, a mapping is needed to identify which of the original ranges the input value JK lies within for the particular cell of the partition JK is found to occupy.

For example, the same partition in the second example would be produced if one started with the two ranges $37 \leq JK \leq 59$ and $55 \leq J \leq 99$. Another combination of arbitrary overlapping ranges that would produce the same partition is $00 \leq JK \leq 54$, $00 \leq JK \leq 59$, and $37 \leq JK \leq 99$. Notice how in the first case $37 \leq K \leq 59$ implicitly forms the partition cell 0–36, even though none of the other ranges have 36 as an endpoint. It is clear, however, that a mapping exists that allows a cell to be correlated with either none of, or with one or more of the corresponding original ranges.

In short, any number of arbitrary ranges can be represented as some number of disjoint ranges having a corresponding partition. Some extra overhead in time and decision making may be required to interpret the correspondence. Assuming the partition associated with Table II results from some other initially defined ranges, then Table II could alternatively indicate the location of the input parameter in terms of those ranges, instead of in terms of the associated partition. The choise between the two may depend upon what means are available to implement the task of encoding Table II. This alternate method of encoding forms the basis of the next example.

A final simplified example shows that the overhead of associating cells of a partition with the original ranges can be incorporated into the mechanism that produces the range result from the J- and K-types. That is, suppose a plurality of totally arbitrary continuous ranges must be considered directly, with no special preliminary attention paid to whether they overlap or not, and with no mapping from the associated partition back into the original ranges. One way to accomplish this would be to implement, in parallel, an instance of the first example for each arbitrary range. This third example uses a two range case to illustrate a better approach, and shows that the results are susceptible of direct interpretation, without the overhead for correspondence to a partition spoken of in the second example. Let the ranges be:

$R_1$: $37 \leq JK \leq 54$
$R_2$: $16 \leq JK \leq 53$

The following are the necessary J-types and K-types.
If J equals:
   0, then J-type=a;
   1, then J-type=b;
   2, then J-type=c;
   3, then J-type=d;
   4, then J-type=e;
   5, then J-type=f;
   6, then J-type=a;
   7, then J-type=a;
   8, then J-type=a;
   9, then J-type=a.
Where J-type equal to:
   a means the parameter cannot be in $R_1$ or $R_2$, K does not matter;
   b means the parameter might be in $R_2$, but only if $6 \leq K \leq 9$;
   c means both the parameter
      cannot be in $R_1$, K does not matter, and
      must be in $R_2$, K does not matter;
   d means both the parameter
      might be in $R_1$, but only if $7 \leq K \leq 9$, and
      must be in $R_2$, K does not matter;
   e means the parameter must be in both $R_1$ and $R_2$, for all K;
   f means both the parameter
      might be in $R_1$, but only if $0 \leq K \leq 4$, and
      might be in $R_2$, but only if $0 \leq K \leq 3$.
If K equals:
   0, then K-type=v;
   1, then K-type=v;
   2, then K-type=v;
   3, then K-type=v;
   4, then K-type=w;
   5, then K-type=x;
   6, then K-type=y;
   7, then K-type=z;
   8, then K-type=z;
   9, then K-type=z.
Where K-type equal to:
   v means the parameter is in
      only $R_1$, never for any J-type,
      only $R_2$, provided J-type is c or d,
      both $R_1$ and $R_2$ provided J-type is e or f, and
      neither $R_1$ nor $R_2$, provided J-type is a or b;
   w means the parameter is in
      only $R_1$, provided J-type is f,
      only $R_2$, provided J-type is c or d,
      both $R_1$ and $R_2$, provided J-type is e, and
      neither $R_1$ nor $R_2$, provided J-type is a or b;
   x means the parameter is in
      only $R_1$, never for any J-type,
      only $R_2$, provided J-type is c or d,
      both $R_1$ and $R_2$, provided J-type is e, and
      neither $R_1$ nor $R_2$, provided J-type is a, b or f;
   y means the parameter is in
      only $R_1$, never for any J-type,
      only $R_2$, provided J-type is b, c or d,
      both $R_1$ and $R_2$, provided J-type is e, and
      neither $R_1$ nor $R_2$, provided J-type is a or f; and
   z means the parameter is in
      only $R_1$, never for any J-type,
      only $R_2$, provided J-type is b or c,
      both $R_1$ and $R_2$, provided J-type is d or e, and
      neither $R_1$ nor $R_2$, provided J-type is a or f.

Table III. shows how the desired range information may be obtained given the J-type and K-type of the parameter.

TABLE III

| | Parameter location in $R_1$ and $R_2$ as a function of the associated types for J and K. | | | | |
|---|---|---|---|---|---|
| | v | w | x | y | z |
| a | $\overline{R_1},\overline{R_2}$ | $\overline{R_1},\overline{R_2}$ | $\overline{R_1},\overline{R_2}$ | $\overline{R_1},\overline{R_2}$ | $\overline{R_1},\overline{R_2}$ |
| b | $\overline{R_1},\overline{R_2}$ | $\overline{R_1},\overline{R_2}$ | $\overline{R_1},\overline{R_2}$ | $\overline{R_1},R_2$ | $\overline{R_1},R_2$ |
| c | $\overline{R_1},R_2$ | $\overline{R_1},R_2$ | $\overline{R_1},R_2$ | $\overline{R_1},R_2$ | $\overline{R_1},R_2$ |
| d | $\overline{R_1},R_2$ | $\overline{R_1},R_2$ | $\overline{R_1},R_2$ | $\overline{R_1},R_2$ | $R_1,R_2$ |
| e | $R_1,R_2$ | $R_1,R_2$ | $R_1,R_2$ | $R_1,R_2$ | $R_1,R_2$ |
| f | $R_1,R_2$ | $R_1,\overline{R_2}$ | $\overline{R_1},\overline{R_2}$ | $\overline{R_1},\overline{R_2}$ | $\overline{R_1},\overline{R_2}$ |

The principle of the third example still requires only the same basic implementation means as the first example.

There are some points worth noting before leaving these three examples for a discussion of a preferred embodiment. The first of these points is that the technique does not require that the input parameter be of any specific number system, although the radix used must be known. Second, J and K could be of any convenient radix. J and K could even have a large radix that would normally be thought ill-suited for use because of a high number of different symbols required; e.g., a radix of $2^{10}$. To be used by human beings that radix would require one thousand and twenty-four discrete symbols. This need not bother a digital machine, however, since any symbols would be encoded as so many bits, anyway. Third, J and K would not necessarily have to have the same radix.

What is required of J and K is that they combine to form a two-digit "number" whose value can range from zero up to the maximum value of the parameter whose value is to be checked against the one or more ranges. If J and K are of the same radix then their representation of a parameter value is an arabic representation, as in each of the first three examples.

If the parameter can range over a large number of values, say, up to 220, then the radix for J and K will indeed be large. But this does not mean that the number of J-types and K-types goes up correspondingly. It does not, and is instead determined solely by the nature of the range, and if there is more than one, by the way they overlap or not. Of course, the J-type and K-type symbols themselves are arbitrary. We have used opposite ends of the lower case Roman alphabet to minimize the possibility of confusion. In a digital embodiment there is no reason why separate instances of the binary code of 010 could not respectively represent a second J-type and a second K-type.

Finally, it will readily be appreciated that the scheme lends itself admirably to implementation with look-up tables, provided there is some means at hand to pre-load the tables in accordance with the range or ranges to be checked for. In a preferred embodiment to be described three tables are needed: one to provide the J-type; one to provide the K-type; and, one to provide the range result based upon the J and K types provided by the first two tables. The range result provided by the third table is a code or arbitrary symbol whose interpretation depends a great deal upon how the ranges are defined. The various look-up tables can be implemented in either hardware or software, although a hardware implementation affords far greater speed.

Regardless of whether the implementation is in hardware or software, there are two general possibilities if more than one range is involved in a digital system of the type to be described. The range result will be some multi-bit binary value, say, 0101. On the one hand, this might correspond to a "bit-per-range" interpretation that would mean "parameter value falls within ranges one and three (whatever they are) and is outside ranges two and four." (That is, the first and third bits are ones, meaning the first and third ranges are met.) On the other hand, 010 might mean something like 37 the parameter meets the sixth (counting from zero) of sixteen possible conditions" for, say, three ranges. The sixth condition might ultimately mean "the parameter value is in range three, but not in any of the others." This latter mode of interpretation is called "range-per-code." Both the bit-per-range and range-per-code types of range result are possible and useful, as described below.

It will be appreciated that the bit-per-range format also lends itself to detecting that the input parameter is not within certain specified ranges, for instance, by inspecting for zero's in the range result output, rather than for one's.

A J-K In-Range Detector

FIG. 1 illustrates generally how three properly loaded Random Access Read-Write Memories (RAM's) can be combined according to a preferred embodiment of the invention to produce a circuit 1 that determines if a digital input value is within one or more arbitrary ranges. If for some reason the range or ranges are permanently predetermined, the RAM's may be replaced with Random Access Read Only Memories (ROM's). In either case it is preferred that a static memory be used; i.e., one that provides a steady state data output in response to a steady state address input.

An n-bit input value 2 representing the value of the parameter to be checked is divided into a most significant portion 3 of n/2 bits and a least significant portion 4 of n/2 bits. In a preferred embodiment n is an even number, although that need not always be the case. If n were odd, then one could either add a dummy bit, or let portions 3 and 4 be unequal. Neither causes a problem. The most significant n/2 bits 3 represent an integer J, just as in the three simplified examples. The least significant n/2 bits 4 represent an integer K. These collections 3 and 4 of bits may conveniently be referred to as the J-bits and the K-bits, respectively.

The J-bits are applied as an address to a static J RAM 5. At each address within the J RAM 5 is stored a code (the J-type) representing, for the particular ranges defined, the correct J-type for each corresponding value of J. J RAM 5 thus functions as a look-up table. A looked-up J-type is output as a binary pattern upon output lines 7. In like fashion the K-bits are applied as an address to a static K RAM 6 upon whose output 8 appears a code representing the K-type associated with the applied value of K.

The J- and K-type look-up operations are performed simultaneously. Following the J- and K-type look-up operations the J-type output 7 and K-type output 8 are combined and applied as an address 9 to an ID (identification) RAM 10. This static RAM functions as a look-up table providing various appropriate range result codes upon an output 11, based upon the various possible combinations of the J-types and K-types. In this way, once the three static RAM's 5, 6 and 10 are loaded to reflect the desired ranges, an input parameter value can be tested in the time required for the input to propagate through the two levels of memory plus the time for interpreting or responding to the range result code.

Figure 2:
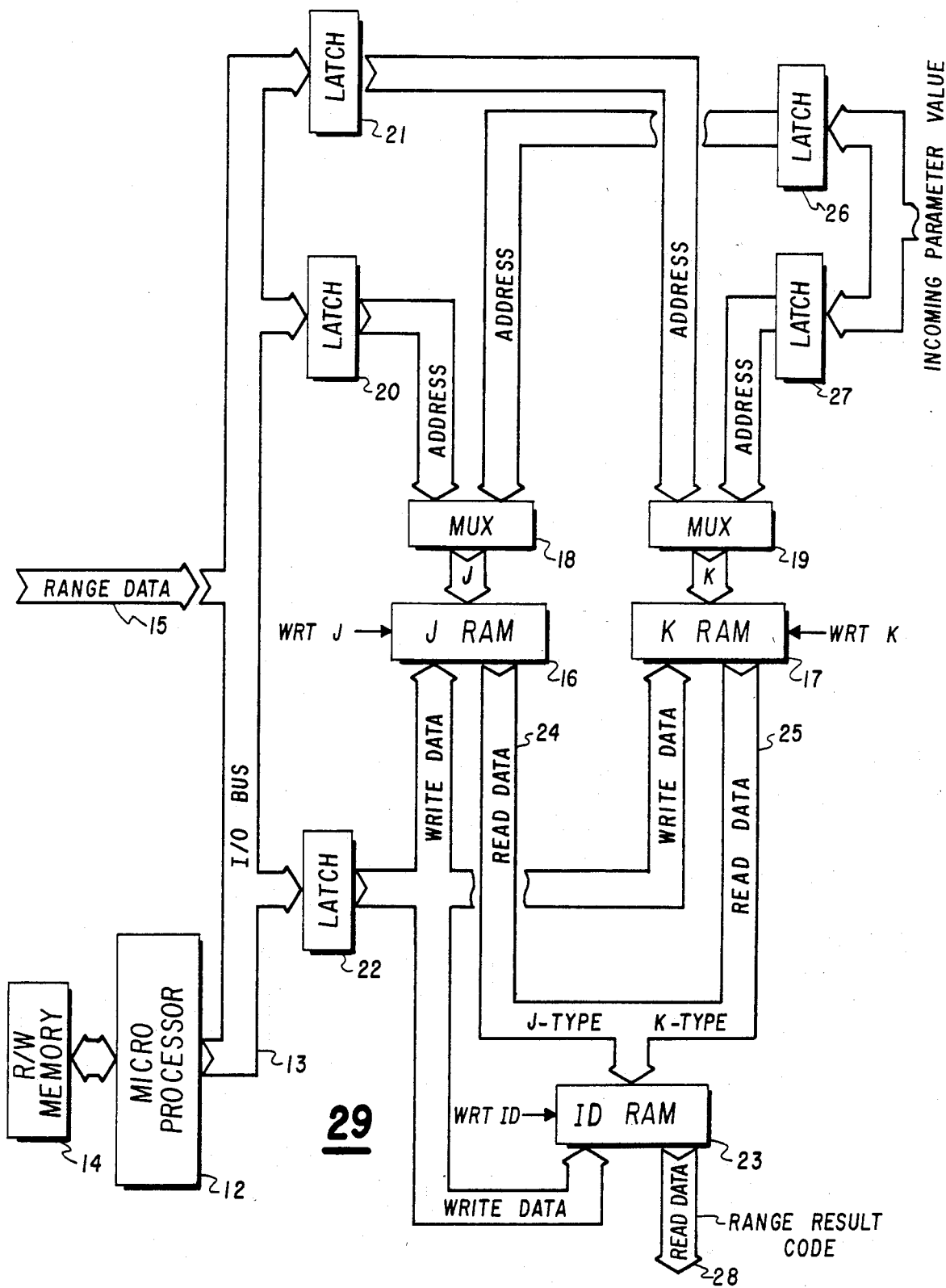
FIG. 2 is a more detailed block diagram of the circuit of FIG. 1, illustrating a microprocessor controlled mechanism for loading the RAM's with information corresponding to preselected ranges.

If circuit 1 of FIG. 1 is to employ RAM's then some means must be provided to load them according to the desired ranges. FIG. 2 illustrates one general way in which this can be done. A microprocessor 12 is connected to an I/O Bus 13 and a Read/Write Memory 14. The I/O Bus 13 is connected to, among other things, a source of Range Data 15 specifying the desired ranges. For example, the ultimate source of the Range Data 15 might be a keyboard (not shown) where a user would interact with some aspect of an operating system whose code is executed by the microprocessor 12. At the behest of the user the system inquires about the desired ranges and proceeds to build in the Read/Write Memory 14 images of the tabular contents to be loaded into the J, K and ID RAM's. Once that is done the images are transferred to the actual RAM's.

In many applications the loading of the RAM's is not an operation that must be done at the highest conceivable speed, and a few extra milliseconds for loading can be tolerated if some hardware can be saved. The circuit 29 of FIG. 2 is such a circuit. The J RAM 16 and K RAM 17 are first loaded with values convenient for the rapid addressing of the ID RAM 23. For example, if each of the J and K RAM's 16 and 17 has outputs n-bits wide then the first $2^n$ locations in each would be loaded with the respective terms of the series $0, 1, 2, \ldots, 2^n-1$. Once loaded in this fashion it is easy to control the address of ID RAM 23 according to the address applied to the J and K RAM's 16 and 17.

To digress briefly, achieving this or any other loading of the J and K RAM's 16 and 17 requires first that, MUX's (multiplex switches) 18 and 19 are set to address the J and K RAM's according to the contents of latches 20 and 21, respectively. The content of each of those latches is previously set up as an address by the microprocessor 12 using the I/O Bus 13. Also previously set up is the data in latch 22, whose output is connected to each of the write-data inputs for the J, K and ID RAM's. Once all three latches have been set up WRT J is briefly made true to actually write the data of latch 22 into the J RAM 16 at the location of the address in latch 20. A similar write operation subsequently occurs with the data for the K RAM 17. The J and K RAMS's could be written into simultaneously, if desired, provided that the appropriate additional hardware is employed. This setting-up and writing operation is repeated for as many different locations in each of the J RAM and the K RAM as need written into.

Once the J and K RAM's are loaded they can be addressed and their contents read simply by keeping WRT J and WRT K false and putting the desired address into latches 20 and 21. The stored data will then appear as steadystate signals upon outputs 24 and 25.

Returning now to the overall task of transferring the images from the Read/Write Memory 14 to the J, K and ID RAM's, once the J and K RAM's have been loaded to allow convenient addressing of the ID RAM 23, the J and K RAM's are sequentially addressed in a way that produces, in order, the sequent address of the ID RAM 23. At each address the corresponding portion of the image of the ID table is written into latch 22, whose output is also connected to the write data input lines of the ID RAM 23. Following that, WRT ID is briefly made true, the address changed and process repeated until the ID RAM 23 is fully loaded.

At this point the J and K RAM's are then loaded with their actual intended contents from the J and K image tables in the Read/Write Memory 14.

For the sake of simplicity, the various details of controlling the various WRT lines to the RAM's, control lines to the MUX's and the strobe lines to the latches have been omitted.

Once the J, K and ID RAM's are loaded MUX's 18 and 19 are set to address the J and K RAM's according to the contents of latches 26 and 27, respectively. The value of the incoming parameter to be checked against the ranges is loaded into these two latches, and the circuit 29 now operates as described for circuit 1 of FIG. 1 to produce an output Range Result Code 28.

It is clear that additional latchs and MUX's can be incorporated into the circuit 12 of FIG. 2 to allow the ID RAM 23 to be addressed directly as are the J and K RAM's. Also notice that once the RAM's of circuit 12 are loaded, the input to be checked can come from either latches 26 and 27 or from latches 20 and 21.

The important aspects of addressable depths and output widths for the J, K and ID RAM's of the circuits of FIGS. 1 and 2 will now be considered. Some aspects are apparent, such as the obvious need for the number of J-bits plus the number of K-bits to sum to at least the number of bits in the parameter input value. Assuming that the latter is n and (for ease of explanation only) that both n is even and the number of J-bits and K-bits equals n/2, it is also clear that each of J RAM and K RAM must address $2^{n/2}$ locations.

What is less apparent is the number of bits required in the respective outputs of the J and K RAMS. And while it is clear that whatever those numbers are, their sum (say, m) is the number of address bits applied to the ID RAM, clearly requiring it to contain $2^m$ addressable locations, the number of bits required to describe the Range Result Code is not immediately obvious, either. The width in bits of each of the respective outputs of the J, K and ID RAM's depends heavily upon the number of ranges to be decoded and upon whether those ranges are allowed to be entirely arbitrary (i.e., overlap any which way) or are restricted to being disjoint (although perhaps immediately adjacent) ranges that do not contain even a single common point. Each of these widths in bits will now be discussed in turn, in light of these two extremes of range definition.

The number of bits in the output of the J RAM is determined in accordance with the number of distinct J-types that are required. To see what that number is, it may be helpful to consider the following characterization of what the J RAM really does. With respect to a given range $R_s$ the J RAM uses the input value of J to identify one of the following four possibilities:

(i) the parameter must be in $R_s$;
(ii) the parameter is in $R_s$ if K meets certain first conditions;
(iii) the parameter is in $R_s$ if K meets certain second conditions; or
(iv) none of the above.

Examples of cases i–iii are clearly shown in the simplified examples. But the exact meaning of case iv, "none of the above," depends upon whether the ranges may be arbitrary or must be disjoint. If the ranges are allowed to be arbitrary case iv amounts to "not in $R_s$, but perhaps in some other range." If the ranges are required to be disjoint, but their union is not the entire value space, case iv can be allowed to mean "not in $R_s$, nor in any other range, either." In the case of a genuine partition where the union of the disjoint ranges is exactly the value space, case iv means simply "not in $R_s$" for each $R_s$. Thus, no range in a genuine partition needs case iv.

For arbitrary ranges each of cases i–iv represents four different necessary J-types for each range $r_s, R_t, \ldots$. Therefore, if Q arbitrary ranges are desired 4Q different J-types are needed, necessitating r bits of width at the output 7 of the J RAM, where $r = (\log_2 Q) + 2$ if the right-hand members is integral, and $r = int(\log_2 Q) + 3$ if otherwise.

But if the ranges $R_s, R_t, \ldots$, are guaranteed disjoint, then each different range generates only three differing J-types, while they all share a single common J-type designating case iv. Thus, for Q-many disjoint ranges $1 + 3Q$ distinct J-types are needed. From this it can be seen that, for a given Q, the number of bits needed in the output to handle the arbitrary case is at least equal to the number needed to handle the disjoint case. (If $Q \geq 1$, then $4Q \geq 1 + 3Q$, and $\log_2(4Q) \geq \log_2(1+3Q)$.) What is more, if the J RAM is chosen to accommodate four or more arbitrary ranges, then some greater number of mixed arbitrary and disjoint ranges, or some greater still number of purely disjoint ranges, can be accomodated by that same J RAM.

The number of bits in the output 8 of the K RAM is determined in accordance with the number of distinct K-types that are required. What the K RAM does is classify the input value of K according to the various different instances that are of interest, based on the locations of the upper and lower endpoints of the ranges. Suppose for a moment that any defined range had end points describable as the value $J_e K_e$, where $K_e$ was always zero. Then there would be no need for K RAM; the incoming value of J would tell all and the incoming K could be ignored. But that will seldom, if ever, be the case, and because $K_e$ can assume potentially K-many plus one different values, if there are sufficiently many ranges there might indeed need to be K-many plus one K-types. In practice, however, the number of ranges Q severely limits the number of possible different K-types to 1+2Q.

There are K-many plus one ordered things (i.e., the consecutive values of K: 0, 1, 2, . . . ,K) that need to be classified (i.e., traded for an associated K-type). Each range can supply at most two unique non-zero range endpoints, for a maximum of 2Q points. If any endpoint is equal to any previously supplied endpoint or to an endpoint of the value space, it does not contribute to the sum. Now a maximum of 2Q endpoints, when mapped into the ordered set of different values of K: 0, 1, 2, . . . ,K will partition that set into at most 1+2Q subsets. The members of the various subsets correspond to the maximum number of different K-types. The actual number of necessary K-types might be less, as the maximal correspondence of the peceeding sentence may include redundant K-types, as shown in the following example. Consider the ranges $32 \leq JK \leq 35$ and $57 \leq JK \leq 58$. This produces the five subsets [0,1], [2,3,4,5], [6], [7,8], and [9]. Of these, the first, third and fifth can all have the same K-type, while the second and fourth each have different K-types. Therefore, if the output 8 of the K RAM has as number of bits the least integer greater than or equal to $\log_2(1+2Q)$, then it is guaranteed capable of encoding the needed number of K-types.

Once the numbers of bits needed to represent the various J-types and K-types are known, the number of address bits to be applied to the ID RAM is also known, and is simply their sum. Furthermore, it seems clear from information theory that, at least in the case of arbitrary ranges, the range result symbol requires a bit per range. The addressable depth and output width of the ID RAM is then chosen accordingly.

And to go from a given number of bits to the number of possible ranges, a bit per range in the ID RAM for Q arbitrary ranges is also adequate for 2Q disjoint ranges whose union equals the entire set of possible parameter input values. (That is, for disjoint ranges that amount to a genuine partition of the parameter range, with no missing or overlapping intervals.) Similarly, a given number of J RAM output bits will serve for more disjoint ranges than for arbitrary ones. For both those RAM's less stringent conditions result in an intermediate number of possible ranges, within the extremes shown in Tables IV, V and VI below.

Before turning to those tables, consider how the bit-per-arbitrary-range approach also lends itself in a natural way to the description of the case where there are disjoint ranges, as well as to certain intermediate cases mixing the two types. This method of range result encoding will then be contrasted with another approach that assumes all defined ranges are disjoint. The number of permissible ranges is affected according to which approach is taken.

Figure 3:
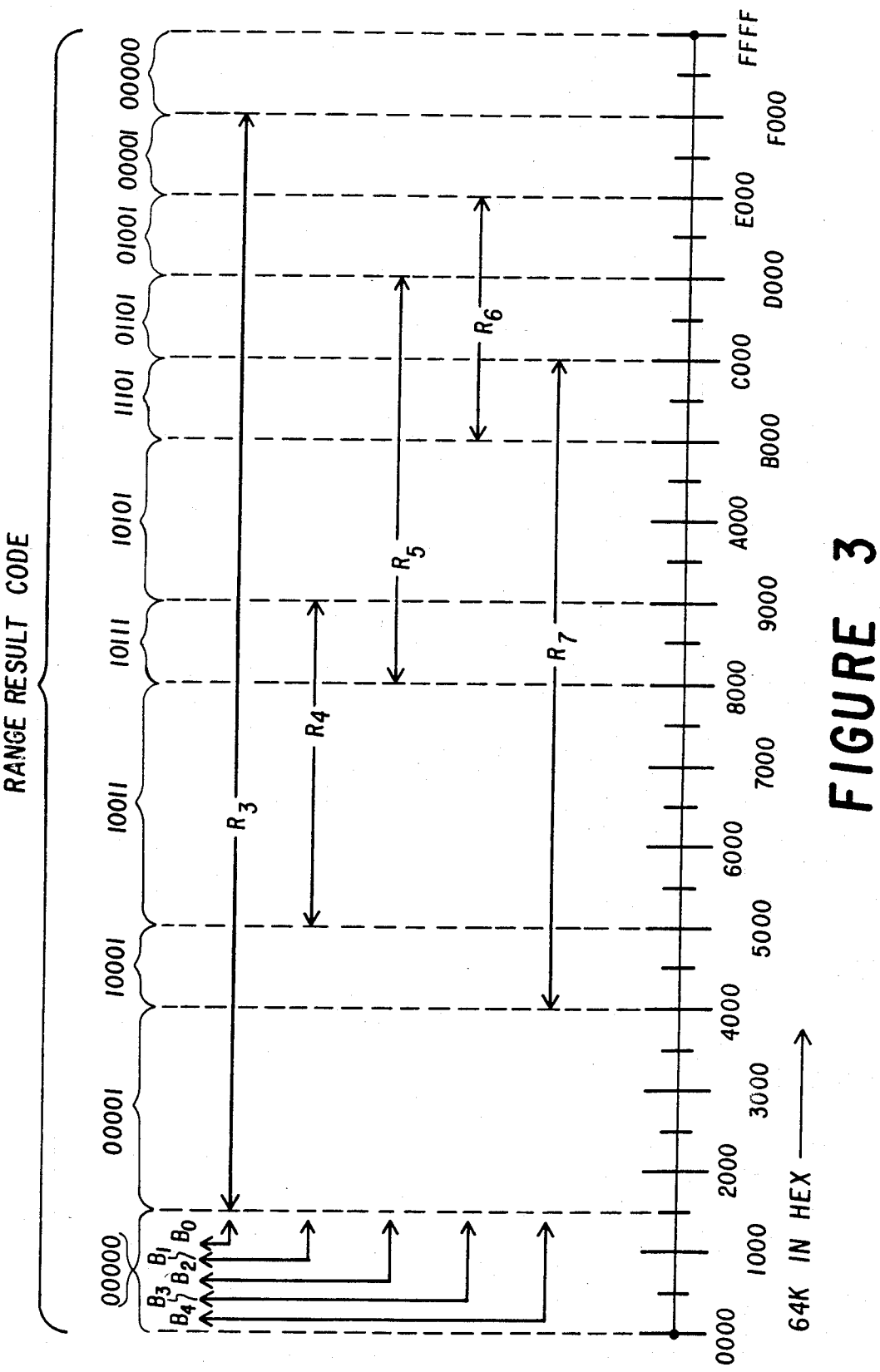
FIG. 3 is a diagram illustrating the bit-per-range format for encoding the range result code of FIGS. 1 and 2.

Consider the eleven cell partition produced by the five ranges $R_3$ through $R_7$ defined upon the $2^{16}$ value space of FIG. 3. Let these ranges be arbitrary and correspond to separate bits in the range result code. The result is a range code that in an absolute minimum of time automatically indicates (directly and without any further interpretation) exactly which ranges an incoming parameter value is within.

The five bits of range result code for the example of FIG. 3 can represent thirty-two different circumstances; far more than the maximum eleven-cell partition that could be obtained with the five ranges permitted under the bit-per-range arrangement. If the natural coding scheme of FIG. 3 were retained then the five ranges would not be defined in advance in such a way that each of the thirty-two possibilities did in fact exist; more ranges would be needed. But that is contrary to the assumption of a bit-per-range that gives the natural coding scheme its appeal. In short, bit-per-range is fast, but it does not make the output bits convey a maximal amount of information. If for certain applications, the speed of operation requirements can be sufficiently relaxed to allow a little additional time for interpretation or further decoding of the range result code, then the natural coding of the bit-per-range scheme of FIG. 3 can be replaced with a range-per-code scheme like the one shown in FIG. 4.

Figure 4:
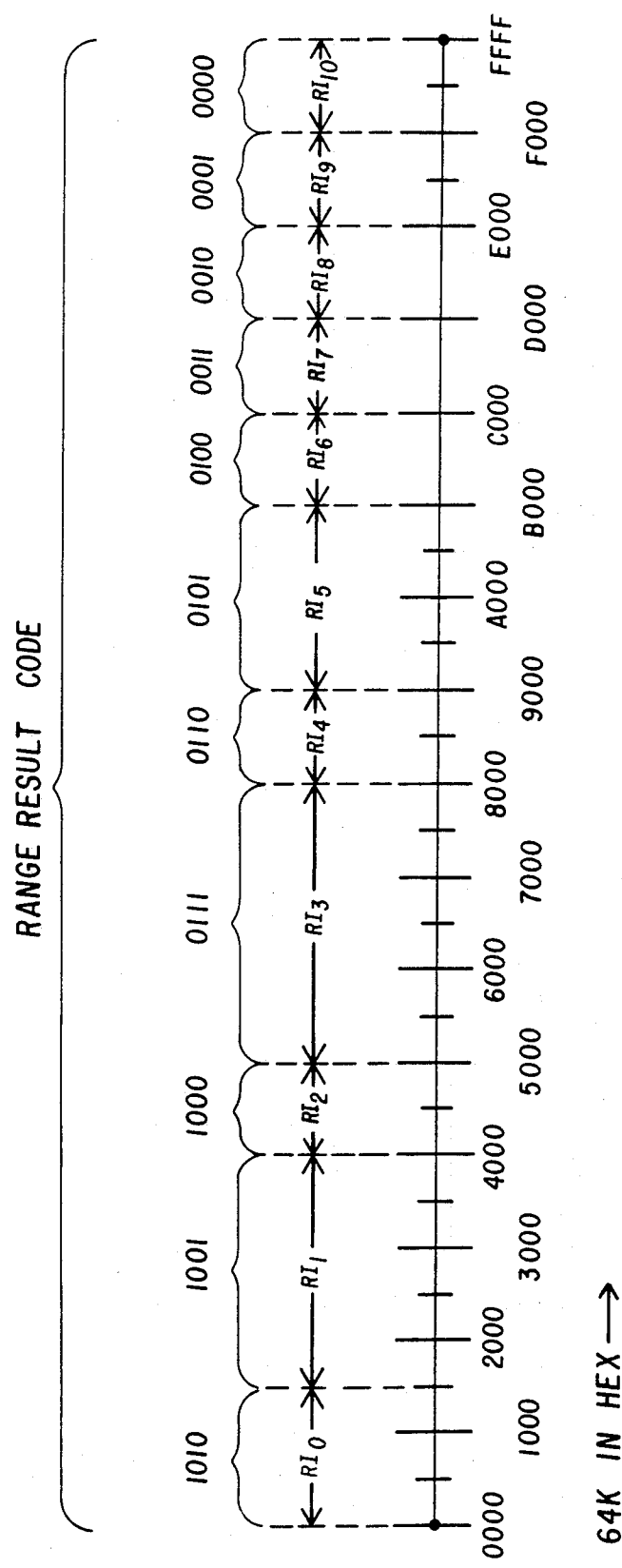
FIG. 4 is a diagram illlustrating the range-per-code format for encoding the range result code of FIGS. 1 and 2.

For the sake of comparison FIG. 4 begins with the same $2^{16}$ value space and range endpoints as in FIG. 3. The five ranges of FIG. 3 have ten separate endpoints which, as shown in FIG. 4, partition the value space into eleven range intervals designated $RI_0$ through $RI_{10}$. In FIG. 4 these eleven ranges have been arbitrarily numbered 0000 through 1010. Note that the example is not complicated enough to need the fifth range result bit; only four bits are needed for the number of ranges defined. This emphasizes a useful advantage to this range result coding scheme: fewer range result bits can represent "more ranges." The trade-off between the two encoding schemes involves speed and the overhead of initially merging the endpoints to redefine the ranges and the subsequent interpreting of the range result code.

There are at least two ways the range result code of FIG. 4 could be interpreted. The first is with reference to the original ranges $R_3$ through $R_7$ of FIG. 3. For example, the range result code 0111 of FIG. 4 can be interpreted to mean "the input parameter value lies with ranges $R_3$, $R_4$, and $R_7$ of FIG. 3." A second method of interpretation ignores FIG. 3 and treats the eleven ranges $RI_0$ through $RI_{10}$ of FIG. 4 as a partition of the value space that is of originaL and primary interest in itself. Thus, range result code 0111 would mean "the input parameter values lies within the range $RI_3$ as defined in FIG. 4."

Of course, it is also clear that one could encode disjoint ranges with the bit-per-range format.

Another possibility would be to encode arbitrary ranges by first obtaining their associated partition and then encoding its cells with the range per code format. One would then rely upon some additional table of correspondence to relate the range result code to the original range or ranges containing the value of the input parameter.

Tables IV, V and VI below summarize the various limits upon different types of ranges that arise with various widths in bits for the different RAM's.

TABLE IV

Minimum numbers of ranges as a function of J RAM output width.

| IF THE NUMBER OF J RAM OUTPUT BITS IS: | THEN THE MINIMUM NUMBER OF/ | |
|---|---|---|
| | ARBITRARY RANGES IS: | DISJOINT RANGES IS: |
| 1 | 0 | 0 |
| 2 | 1 | 1 |
| 3 | 2 | 2 |
| 4 | 4 | 5 |
| 5 | 8 | 10 |
| 6 | 16 | 31 |
| . | . | . |
| N | $2^{N-2}$ | $\text{Int } (2^N - 1)/3$ |

TABLE V

Minimum numbers or ranges as a function of K RAM output width.

| IF THE NUMBER OF K RAM OUTPUT BITS IS: | THEN THE MINIMUM NUMBER OF/ | |
|---|---|---|
| | ARBITRARY RANGES IS: | DISJOINT RANGES IS: |
| 1 | 0 | 0 |
| 2 | 1 | 1 |
| 3 | 3 | 3 |
| 4 | 7 | 7 |
| 5 | 15 | 15 |
| 6 | 31 | 31 |
| . | . | . |
| N | $\text{Int } (2^N - 1)/2$ | $\text{Int } (2^N - 1)/2$ |

TABLE VI

Maximum numbers or ranges as a function of ID RAM output width.

| IF THE NUMBER OF ID RAM OUTPUT BITS IS: | THEN THE MINIMUM NUMBER OF/ | |
|---|---|---|
| | ARBITRARY RANGES IS: | DISJOINT RANGES IS: |
| 1 | 1 | 2 |
| 2 | 2 | 4 |
| 3 | 3 | 8 |
| 4 | 4 | 16 |
| 5 | 5 | 32 |
| 6 | 6 | 64 |
| . | . | . |
| N | N | $2^N$ |

Each of Tables IV–VI assumes that none of the others impose a limit on the number of ranges. From an inspection of these tables it is apparent that for J and K RAM's of equal output widths the width of the J RAM establishes the limit on the number of ranges. It should be noted, however, that the values shown are worst case minimums, and such conditions as redundant J and K types produced by identical range endpoints can increase the permissible number of ranges, provided of course, that the output width of the ID RAM does not impose a limit that is lower. In actual practice with the circuit in a logic state analyzer, it has been found that it is tedious to attempt predictions of just how much of any particular mixture of overlapping and disjoint ranges can be accomodated with a set of RAM's. The quickest and simplest approach is to try it, and see if the RAM loading software can fit it all in.

Before leaving the general topic of what goes into the RAM's and how many ranges are possible, etc., a related topic of "don't care bits" will be discussed. It often happens in a measurement situation that certain selected bits in the incoming parameter value are of no interest and are to be ignored. Short of rearranging the connections to the input data to suppress the don't care bits, or forcing them to some difinite value, neither of which is really necessary or desirable, the predictable variability in the absolute incoming parameter value introduced by the variability in the don't care bits must be dealt with in the way the J and K RAM's are loaded. This is not difficult but it may affect the number of ranges that can be decoded. There are a number of cases to be considered.

First, suppose that each of the range definitions operable at any one time includes the exact same don't care bits. This case does not affect the number of permissible ranges, and here is how it is handled. The don't care bits can be of any number, need not be contiguous, and can be anyplace in the incoming parameter. Assume they are all zeros. The remaining bits in the incoming parameter address certain collections of locations in the J and K RAM's. If there is no don't care bit associated with one of those RAM's, then its associated collection is its entire address space, and that RAM is loaded as usual. But at least one or both of the RAM's will have collections that are less than its entire address space. The individual addresses comprising the collection are loaded with their types in the obvious way, as if the don't care bits were indeed always zero. But they won't be, of course, and if there are r don't care bits then the collection just spoken of is but $1/(2^r)$ of the address space. That is, there are still $2^r-1$ other collections of addresses. But those collections are loaded with images identical to the one just described. The r don't care bits have $2^r$ possible patterns, of which the all zeros possibility has been taken care of. All that is needed is to set the don't care bits in turn to each of the different $2^r-1$ remaining possible patterns and load the same image for the non-don't care bits. That is done for each RAM whose parameter input bits includes a don't care bit.

Three examples may help clarify this case. First, assume the upper two most significant bits in the incoming parameter value are don't cares. The effect of this would be to divide a J RAM addressed by more than two bits into four consecutive quarter regions, each containing the same image of J-types. Second, assume the least significant bit in the incoming parameter value is a don't care. The effect of this would be to divide a K RAM addressed by more than one bit into consecutive pairs of the various K-types for the sequent even-odd pairs of consecutive addresses beginning at zero. Finally, suppose the entire upper portion of the incoming parameter value is don't care bits, masking all of the J-bits. Then the J RAM is everywhere loaded with a single J-type and the K RAM is dealt with as previously described. So much for the case where the exact same don't care bits are associated with each range.

Now suppose that some ranges are to be described using don't care bits while others are not. It is clear that the imaged-loading of a J or K RAM required for a don't care bit in one range is not compatible with a range having no don't care bits: the latter range may need different types loaded into corresponding locations of two or more images. What can be done in this case is to assume that each of the r don't care bits associated with a range turn that range into $2^r$ separate ranges. (An exception is possible if some or all of the r don't care bits are contiguous and include the least significant bit of the J or K RAM being addressed. Such a contiguous collection constitutes a single range.) The J and K RAM's would be loaded on that basis. The ID RAM can be loaded either for bit-per-range or for range-per-code interpretation. Note that if bit-per-range is used the $2^r$ ranges can be recombined to look like a single range as far as the ID RAM is concerned.

Figure 5B:
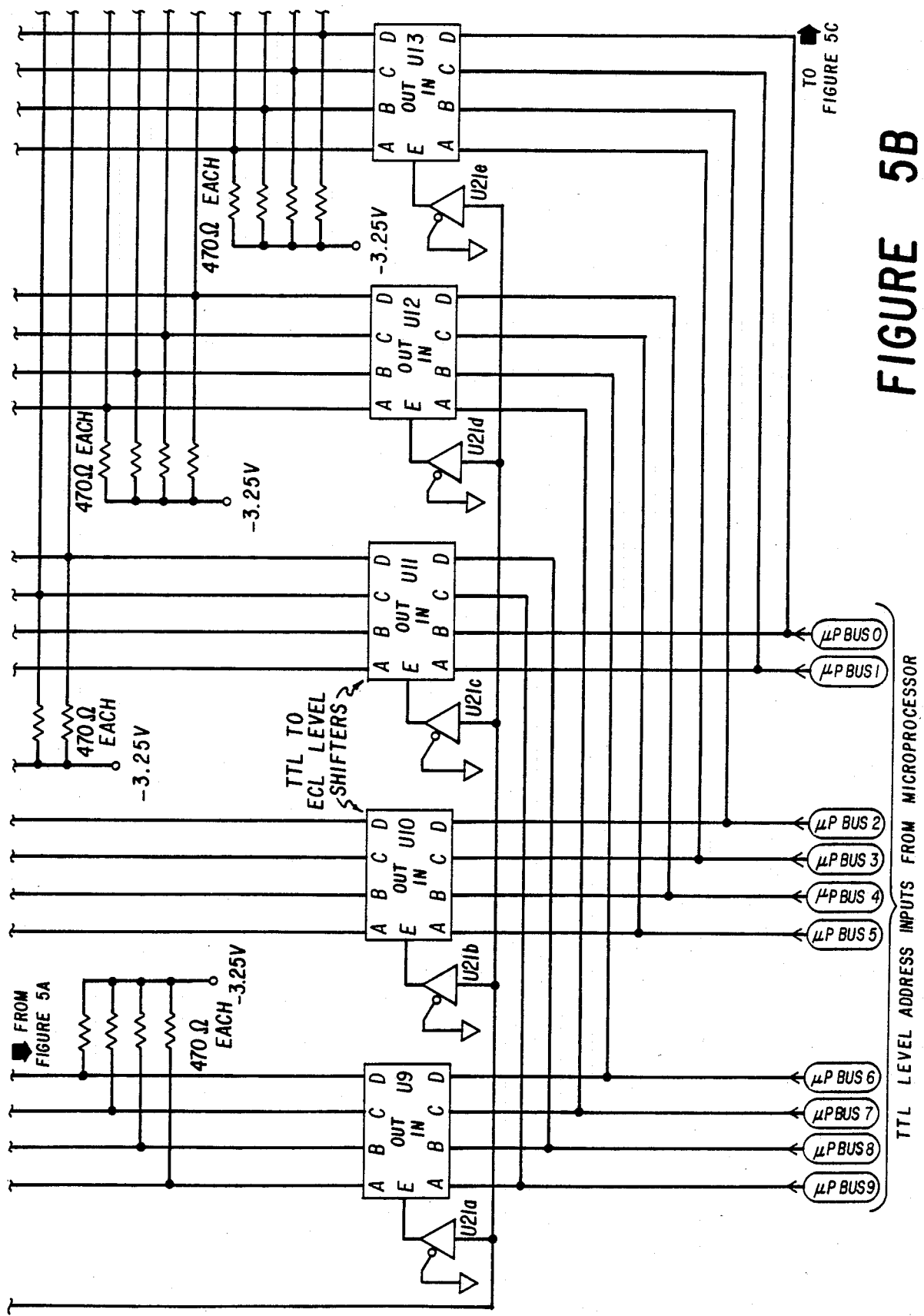
Figure 5C:
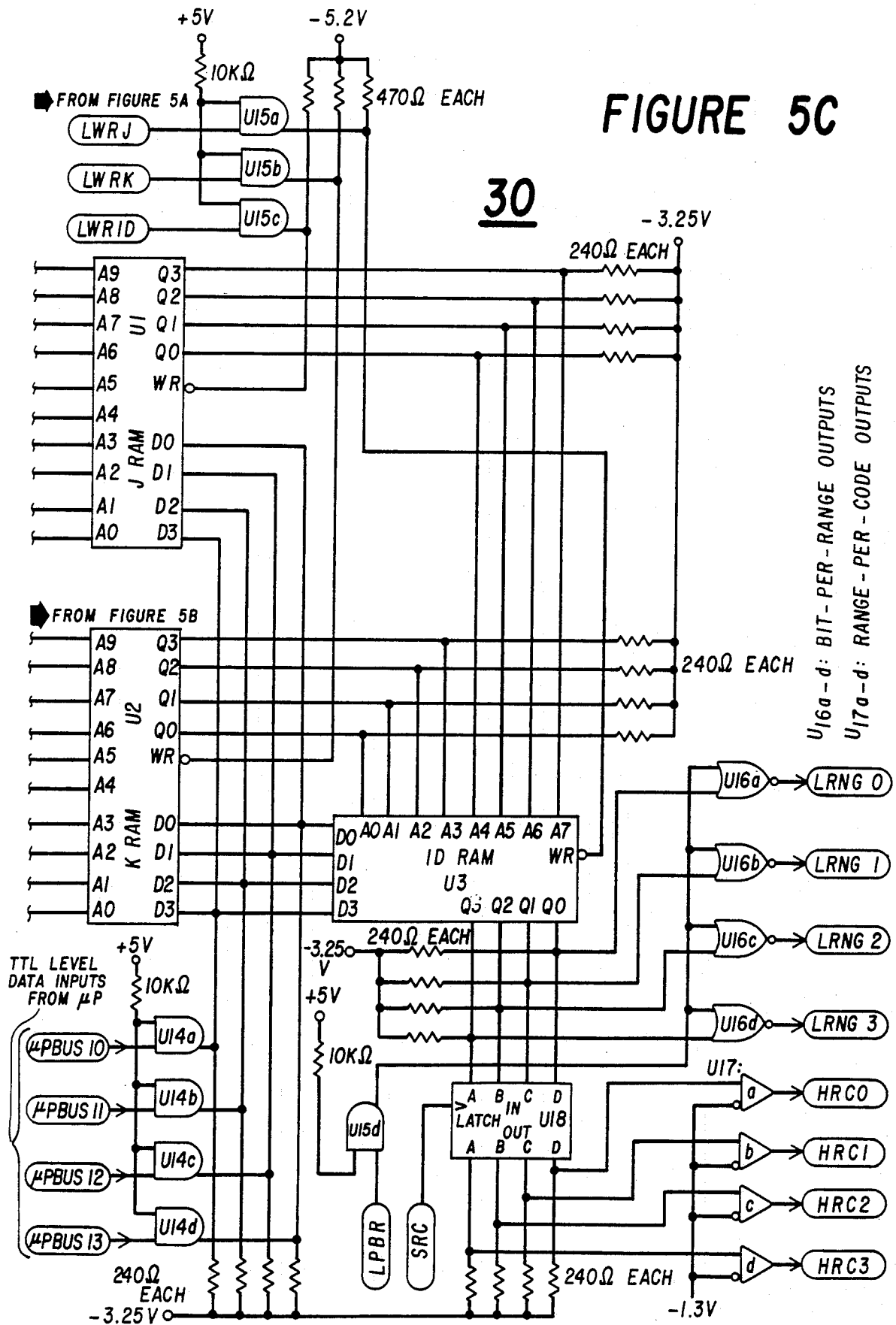

FIGS. 5A–C are a detailed schematic of a range circuit 30 generally similar to circuit block diagram 29 of FIG. 2. The major portion of the range circuit 30 in FIGS. 5A–C is part of an actual circuit used in the HP Model 64620S Logic State Analyzer option for the HP 64000 family of logic development system mainframes. Shown are the details surrounding the J, K and ID RAM's; the details concerning the microprocessor based control scheme are generally conventional, and owing to their general complexity they have been omitted. The reader will also appreciate that when a segment of schematic such as in FIGS. 5A–C has been excerpted from a fairly large system there are frequently ragged edges that need to be amputated as bloodlessly as possible. The present instance was no exception, and the following liberty has been taken. In the actual circuit the level shifters $U_9$–$U_{13}$ are instead another circuit element whose function in the Logic State Analyzer is complicated and well outside the scope of the present disclosure. For the sake of brevity and to more clearly emphasize the invention, the element has been replaced with level shifters $U_9$–$U_{13}$. The circuit 30 of FIGS. 5A–C corresponds very closely to the central portion of the block diagram 29 of FIG. 2. Referring to FIG. 5C, $U_1$ and $U_2$ (the J RAM and K RAM, respectively) are 1024×4 high speed static RAM's. $U_3$ (the ID RAM) is a 256×4 high speed static RAM. The various Q outputs (i.e., read data) of $U_1$ and $U_2$ are connected to the address inputs $A_0$–$A_7$ of $U_3$. The range result code appears at the $Q_0$–$Q_3$ outputs of $U_3$. In instances where the circuit 30 is being operated in the bit-per-range mode the control signal LBPR (LOW=Bit-Per-Range) is set low allowing the outputs $LRNG_0$–$LRNG_3$ of $U_{16a}$–$U_{16d}$ to represent the complements of the $Q_0$–$Q_3$ oupus of $U_3$. In this way the bit-per-range result is made available in a minimum of time. The mechanism that responds to and makes use of the bit-per-range information at $LRNG_0$–$LRNG_3$ is not shown.

When it is understood that the range result code is to be interpreted (i.e., decoded to learn its meaning) the control signal LBPR is set high and the $Q_0$–$Q_3$ outputs of $U_3$ are latched into $U_{18}$ upon receipt of SRC (Strobe Result Code). From there the range-per-code outputs are available on a steady state basis as $HRC_0$–$HRC_3$. A range decoding mechanism (no shown) responds to the latched range result code present at $HRC_0$–$HRC_3$.

When checking an incoming parameter value in either of the bit-per-range or range-per-code modes, a twenty bit incoming parameter value is applied as ten bits of an integer K to $KBIT_0$–$KBIT_9$ and as another ten bits of an integer J to $JBIT_0$–$JBIT_9$. See FIG. 5A. In the present example these are TTL level signals that are converted to ECL level signals by $U_4$–$U_8$ whenever the signal LLOAD is high. To load the RAM's a second set of TTL to ECL translators $U_9$–$U_{13}$ is enabled when LLOAD is set low. That also disables translators $U_4$–$U_8$. While LLOAD is low TTL level J and K RAM address information can be supplied by the microprocessor and its I/O controlled latches (none of which are shown) as signals $uPBUS_0$–$uPBUS_9$. Microprocessor generated input data for loading into RAM's $U_1$, $U_2$, or $U_3$ is supplied as signals $uPBUS_{10-13}$, as shown in FIG. 5C. These signals are buffered by $U14_{a-d}$ and are supplied in parallel to each of the RAM DATA INPUTS $D_0$–$D_3$. Referring still to FIG. 5C, the three signals LWRJ, LWRK and LWRID originate with the mocroprocessor, and after buffering $U_{15a-c}$ determine which of $U_1$, $U_2$, or $U_3$ is to load the data represented by $uPBUS_{10-13}$.

The function of the MUX's of FIG. 2 is performed by the mutually exclusive enablement of only one of the two sets of level translators, according to $U19_a$ and $U19_c$. See FIG. 5A.

Table VII lists specific Motorola or Fairchild device numbers that may be used in the circuit of FIG. 5.

TABLE VII
Devices usable in FIG. 5.

| | | | | | | | |
|---|---|---|---|---|---|---|---|
| $U_1$ | 10474 | $U_8$ | 10124 | $U_{15}$ | 10124 | | |
| $U_2$ | 10474 | $U_9$ | 10124 | $U_{16}$ | 10101 | | |
| $U_3$ | 10422 | $U_{10}$ | 10124 | $U_{17}$ | 10125 | | |
| $U_4$ | 10124 | $U_{11}$ | 10124 | $U_{18}$ | 10176 | | |
| $U_5$ | 10124 | $U_{12}$ | 10124 | $U_{19}$ | 74LS04 | | |
| $U_6$ | 10124 | $U_{13}$ | 10124 | $U_{20}$ | 74LS367 | | |
| $U_7$ | 10124 | $U_{14}$ | 10124 | $U_{21}$ | 74LS367 | | |

DESCRIPTION OF THE ALTERNATE EMBODIMENTS

There are at least three alternate embodiments of the invention. These embodiments may be of use in instances where the total number of input bits comprising the value to be checked exceeds twice the number of address bits for the particular memory devices available. Suppose, for example, that a forty-eight bit value is to be checked. At the present time RAM's having twenty-four address bits are not commercially available. And even if they were available, it's conceivable that their cost would be prohibitively high, prompting a desire to use in their place a larger number of lesser cost RAM's having fewer address bits. With this in mind, we now examine several extensions of the apparatus and method of the previously described preferred embodiments.

One possibility is to use the structure 1 of FIG. 1 recursively, as a component substituted into a larger but structuraly similar circuit. Consider, for example, the circuit block diagram 31 of FIG. 6. In that block diagram an n-bit input value 32 is divided into three groups of bits. These have been labeled "upper n/3 bits" 33, "middle n/3 bits" 34, and "lower n/3 bits" 35. For convenience it has been assumed that n is integrally divisible by three; that need not necessarily be the case, and the three groups of bits just spoken of might well be unequal in number. The three groups of bits 33–35 respectively represent the values of integers I, J and K. In this example J and K are as in FIGS. 1 and 2, and the upper n/3 bits 33 for I may be thought of as newly added most significant bits.

Figure 6:
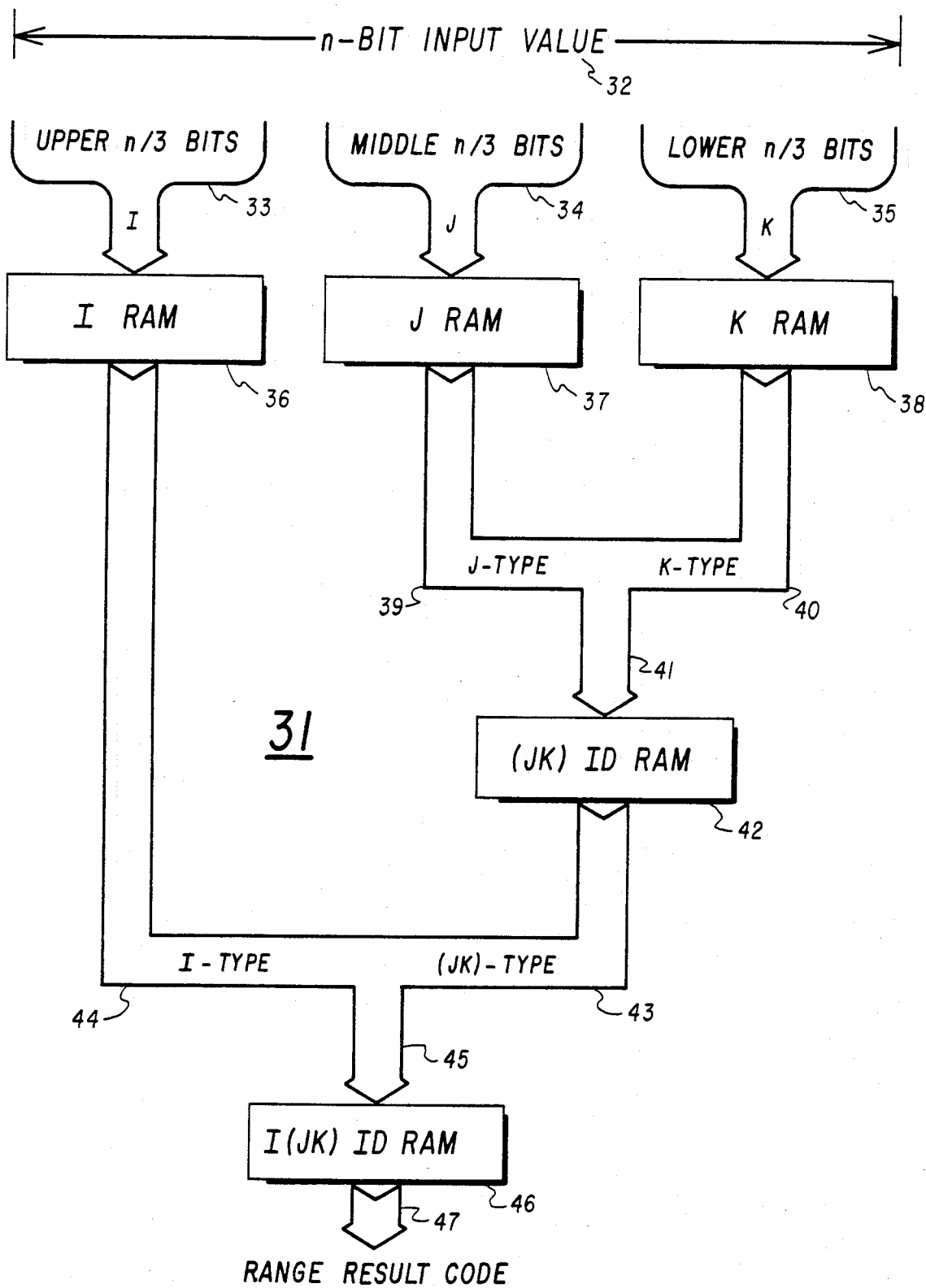
FIG. 6 is a simplified block diagram of a first alternate embodiment of the invention.

There is also a "mirrow image" of FIG. 6 where J and K remain the most significant bits and new least significant bits are added, representing an integer L. In that unshown circuit there would be an L RAM in place of the I RAM and a JKL ID RAM in place of the IJK ID RAM. By the time we are finished with FIGS. 6 through 9 it will be abundantly clear that the JKL circuit is analogous to the IJK circuit about to be described, and for the sake of brevity the JKL version will not be explained in detail. In favor of that description an occasional comparison will be noted. Of the two versions, IJK was chosen because it appears to be somewhat easier to explain and to lead more naturally into the circuit block diagram of FIG. 8.

Continuing now with the discussion of FIG. 6, the I, J and K RAM's each respectively produce outputs 44, 39 and 40 labeled I-, J- and K-types. A (JK) ID RAM 42 produces a (JK)-type 43 which is combined with the I-type 44 and applied as an address 45 to an I(JK) ID RAM 46. In turn, the I(JK) ID RAM 46 produces a range result code 47, which as before, may be either bit-per-range or range-per-code.

While the outward structural similarity between the hardware of FIGS. 1 and 6 is apparent, to obtain maximum flexibility the J and K RAM's 37 and 38, as well as the (JK) ID RAM 42, must be loaded differently than the J, K and ID RAM's 5, 6 and 10 of FIG. 1. A brief digression in the form of a fourth simplified example will show that this is so, and will help set the stage for an explanation of how they are preferably loaded.

Figure 7:
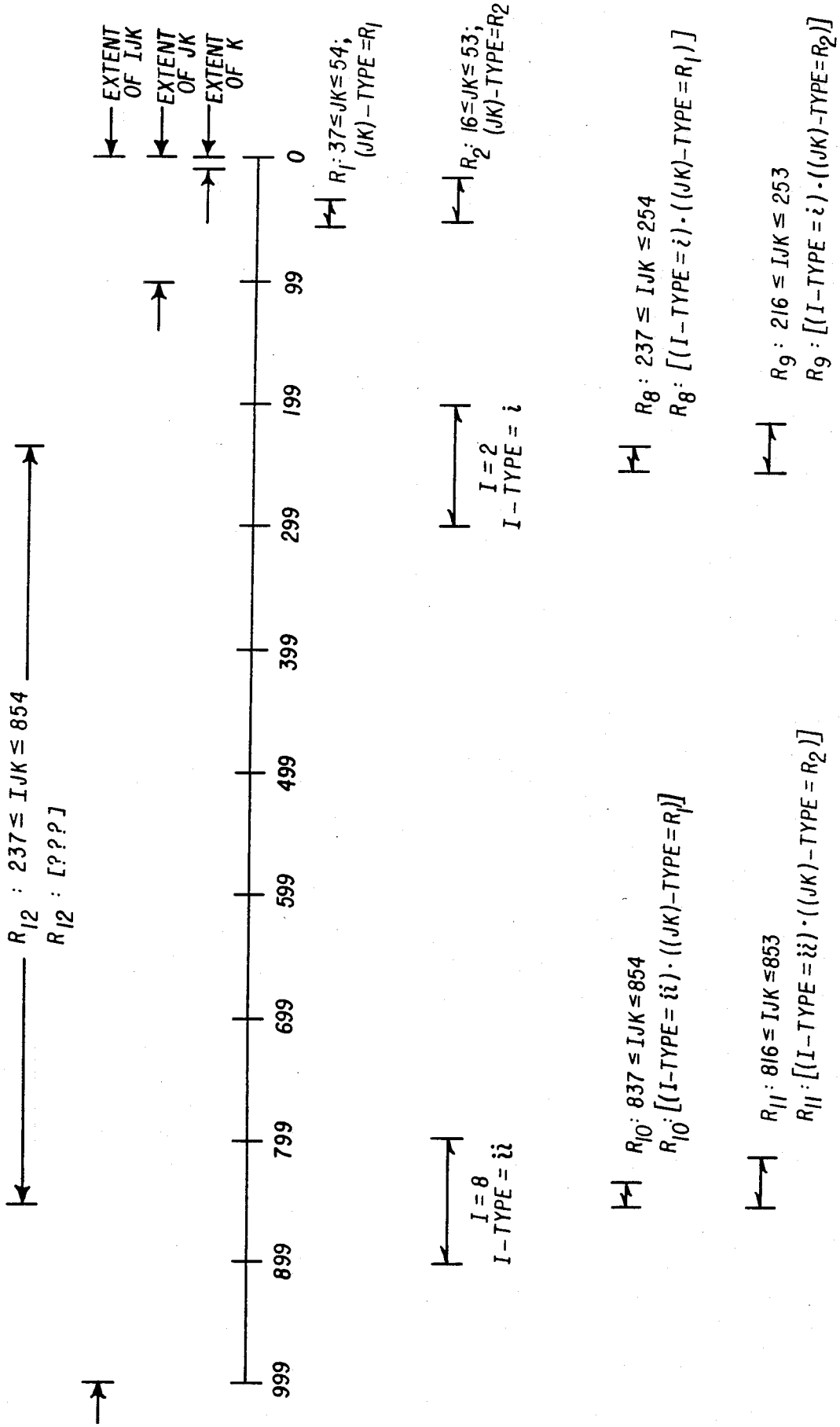
FIG. 7 is a diagram illustrating certain aspects of the block diagram of FIG. 6.

Recalling the first three simplified examples set in the value space zero zero through nine nine, consider preceeding JK with an I to produce the value space zero zero zero through nine nine nine. FIG. 7 is a depiction of that value space and of several ranges defined therein.

To begin with, the figure shows the relative extent of value spaces corresponding to K, JK and IJK. (If the JKL model were under discussion, then L would be to the right of K and one tenth the length thereof. To keep J and K as before, one might think of a new value space as being zero zero point zero through nine nine point nine.)

Consider ranges $R_1$ and $R_2$, defined as before in the first and third simplified examples. Their location and extent is also shown. Now suppose that in FIG. 6 the J, K and (JK) ID RAM's are loaded for $R_1$ and $R_2$ in the same way as they would be loaded for FIG. 1. Then in FIG. 6 the (JK)-types 43 are nothing more than some arbitrary symbols representing $R_1$ and $R_2$. I-types will be chosen as before, based upon what digit values of I are of interest.

As shown in FIG. 7, various additional ranges $R_8$ through $R_{11}$ can be defined and successfully detected. What is essentially happening is that ranges $R_1$ and $R_2$ can be recognized in any of the ten JK subdivisions of IJK corresponding to the different values of I. But each such possible range is limited in extent to the size of JK, which in turn is limited in its location to be wholly within the extent of any single value of I. That is, note that none of ranges $R_8$ through $R_{11}$ cross a boundary between two values of I. What combination of I-types and (JK)-types could possibly detect that an input value lies within the range $R_{12}$: $237 \leq IJK \leq 854$? It can be done, however, provided the J, K and (JK) ID RAM's are loaded in the preferred manner described below.

The key to understanding how the RAM's are to be loaded lies in construing the parallelism between FIG. 1 and FIG. 6 in the following way. The I of FIG. 6 corresponds to J in FIG. 1, while the middle n/3 and lower n/3 bits of FIG. 6, which collectively correspond to (JK), correspond to K. This view has the I RAM 36 corresponding to the J RAM 5, and the (JK) ID RAM 42 corresponding to the K RAM 6. Thus, the I RAM 36 is loaded to produce I-types for the upper n/3 bits 33, while the (JK) ID RAM 42 produces (JK)-types as if it were doing so in response to the combined middle n/3 and lower n/3 bits 34 and 35. Grouped in this way the block diagram 31 of FIG. 6 is functionally similar to block diagram 1 of FIG. 1, except that there are more K-bits than J-bits.

Returning now to the example, here is how the I-types 44, (JK)-types 43 and contents of the IJK ID RAM 46 can be defined to produce a range result code 47 indicative of whether or not IJK lies within $R_{12}$: $237 \leq IJK \leq 854$.

I-type =
- a if $0 \leq I \leq 1$;
- b if $I = 2$;
- c if $3 \leq I \leq 7$;
- d if $I = 8$; and
- a if $I = 9$.

(JK)-type =
- x if $0 \leq JK \leq 36$;
- y if $37 \leq JK \leq 54$; and
- z if $55 \leq JK \leq 99$.

TABLE VIII

Loading of the I(JK) ID RAM to detect an input value within $R_{12}$.

|   | x | y | z |
|---|---|---|---|
| a | 0 | 0 | 0 |
| b | 0 | 1 | 1 |
| c | 1 | 1 | 1 |
| d | 1 | 1 | 0 |

1 = yes
0 = no

Notice that the (JK)-types x, y and z establish a partition on the value space of JK, based upon individual values of J and K. How to do that was the subject of the second simplified example. In accomplishing this task the J RAM 37, K RAM 38 and (JK) ID RAM 42 of FIG. 6 correspond exactly to the J RAM 5, K RAM 6 and ID RAM 10 of FIG. 1. The remaining RAM's of FIG. 6 are loaded as shown below. Since both ends of the lower case Roman alphabet have already been used, and since we have consistently used the upper case Roman letters for other purposes, we now resort to opposite ends of the lower case Greek alphabet to identify the necessary J- and K-types 39 and 40.

J-type =
- $\alpha$ if $0 \leq J \leq 2$;
- $\beta$ if $J = 3$;
- $\gamma$ if $J = 4$;
- $\delta$ if $J = 5$; and
- $\epsilon$ if $6 \leq J \leq 9$.

K-type =
- $\nu$ if $0 \leq K \leq 4$;
- $\phi$ if $K = 5$;
- $\chi$ if $K = 6$;
- $\psi$ if $K = 7$; and
- $\omega$ if $8 \leq K \leq 9$.

TABLE IX (JK)-type as a function of J-types and K-types.

|   | $\nu$ | $\phi$ | $\chi$ | $\psi$ | $\omega$ |
|---|---|---|---|---|---|
| $\alpha$ | x | x | x | x | x |
| $\beta$ | x | x | x | y | y |
| $\gamma$ | y | y | y | y | y |
| $\delta$ | y | z | z | z | z |
| $\epsilon$ | z | z | z | z | z |

What we have done here is to start with I and combine J and K into (JK), proceed as in the preferred embodiment, and then repeat the preferred embodiment within (JK). It is clear that we could just as easily have started with (IJ) and K, using recursion to describe (IJ)

in terms of I and J. This second (IJ)-K approach is the earlier mentioned mirror image of FIG. 6.

A possible disadvantage of a circuit of the sort shown in FIG. 6 is extra propagation time through the RAM's. Information must propagate through three levels of RAM in FIG. 6, compared to only two levels in FIG. 1. In some applications a circuit of the sort shown in FIG. 8 may be more appropriate. The circuit of FIG. 8 also has only two levels of RAM through which signals must propagate.

Figure 8:
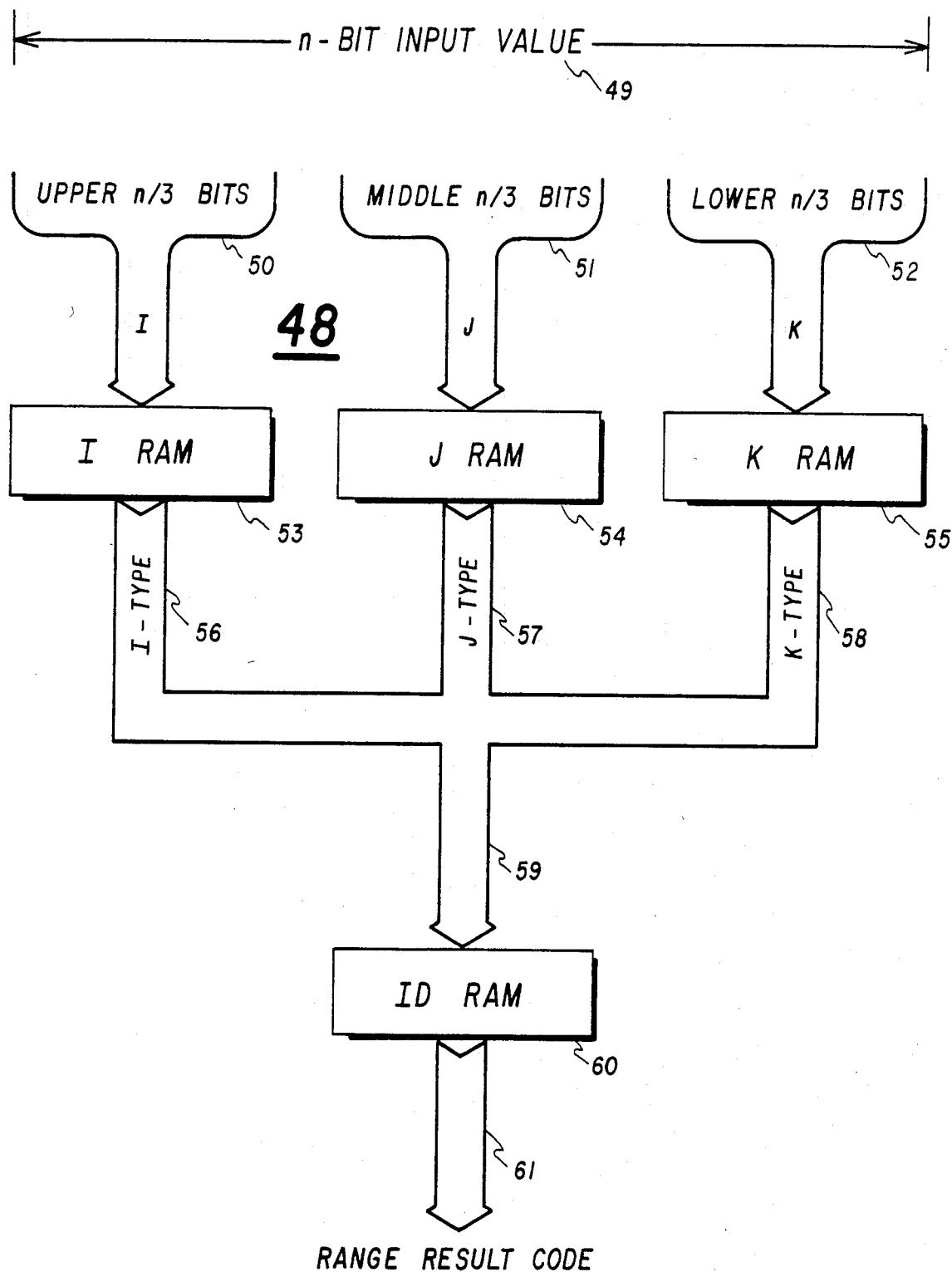
FIG. 8 is a simplified block diagram of a second alternate embodiment of the invention.

FIG. 8 shows a block diagram 48 of a second alternate embodiment of the invention. As in the first alternate embodiment just described in connection with FIG. 6, an incoming n-bit value 49 is divided into upper, middle and lower collections 50, 51 and 52 of n/3 bits. As before, we assume that n is evenly divisible by three, although that is merely for convenience in explanation.

The values of the three collections of bits 50, 51 and 52 are the integers I, J and K. I, J, and K are applied as addresses to their respective RAM's: I RAM 53, J RAM 54 and K RAM 55. The outputs of these RAM's are the respective types: I-type 56, J-type 57 and K-type 58. These three types are merged to form a single address 59 which is then applied to an ID RAM 60, which in turn produces a range result code 61. The range result code 61 may be either bit-per-range or range-per-code.

Given all of the preceding explanations, it is not necessary to develop an entire stand-alone explanation of the operation of the block diagram 48 of FIG. 8. Instead, it will suffice to illustrate the correspondence between the block diagrams 31 and 48 of FIGS. 6 and 8, respectively. What that amounts to is answering the following question: Can ID RAM 60 do the combined work of I(JK) ID RAM 46 and (JK) ID RAM 42 of FIG. 6, assuming all I, J and K types are defined as in the fourth simplified example? This would seem feasible for the reason that the final ID RAM's for both block diagrams 31 and 48 ultimately produce the same output information (the range result code) on the basis of the same basic input information (the I-, J- and K-types). The (JK) ID RAM 42 of FIG. 6 does not add any new information to the basic input information spoken of above. It seems clear that ID RAM 60 has all the needed information to produce the necessary range result code 61. The following demonstration shows that the answer to the earlier-stated question is indeed in the affirmative.

FIG. 9 shows, for $R_{12}$ of the fourth simplified example in connection with FIG. 6, what the correspondence is between the output of ID RAM 60 in FIG. 8 and the various, I-, J- and K-types. And although the example has dealt with only one range the same techniques discussed in connection with the second and third simplified examples can be used to handle multiple range cases with either bit-per-range or range-per-code range result codes.

It is also clear that the structure shown in FIG. 8 is not limited to a three part division of the n-bit input 49. The n-many bits could be divided into four parts, I, J, K and L. Such a case is easily analyzed by first grouping I and J together to form (IJ) and treating it as the J of FIG. 1. Likewise, K and L are grouped to form (KL) and treated as K in FIG. 1. Then each of (IJ) and (KL) are treated as (JK) was in FIG. 6. The result is a structure similar to the block diagram 31 of FIG. 6, except that there have been two recursions, each at the same level. From the explanations offered in support of FIG. 8 it is clear that such an (IJ)(KL) structure can also be implemented with an extension of the structure of FIG. 8. Another way to see this would be to take a three way version of FIG. 8 and simply replace one of the I, J or K RAM's wth the two-way structure of FIG. 1, and then "absorb" the intermediate ID RAM (i.e., the one for the two-way structure) into the original ID RAM. This substitution and absorbtion process can be repeated to produce a division of the n-bit input value into as many parts as needed or desired.

Figure 10:
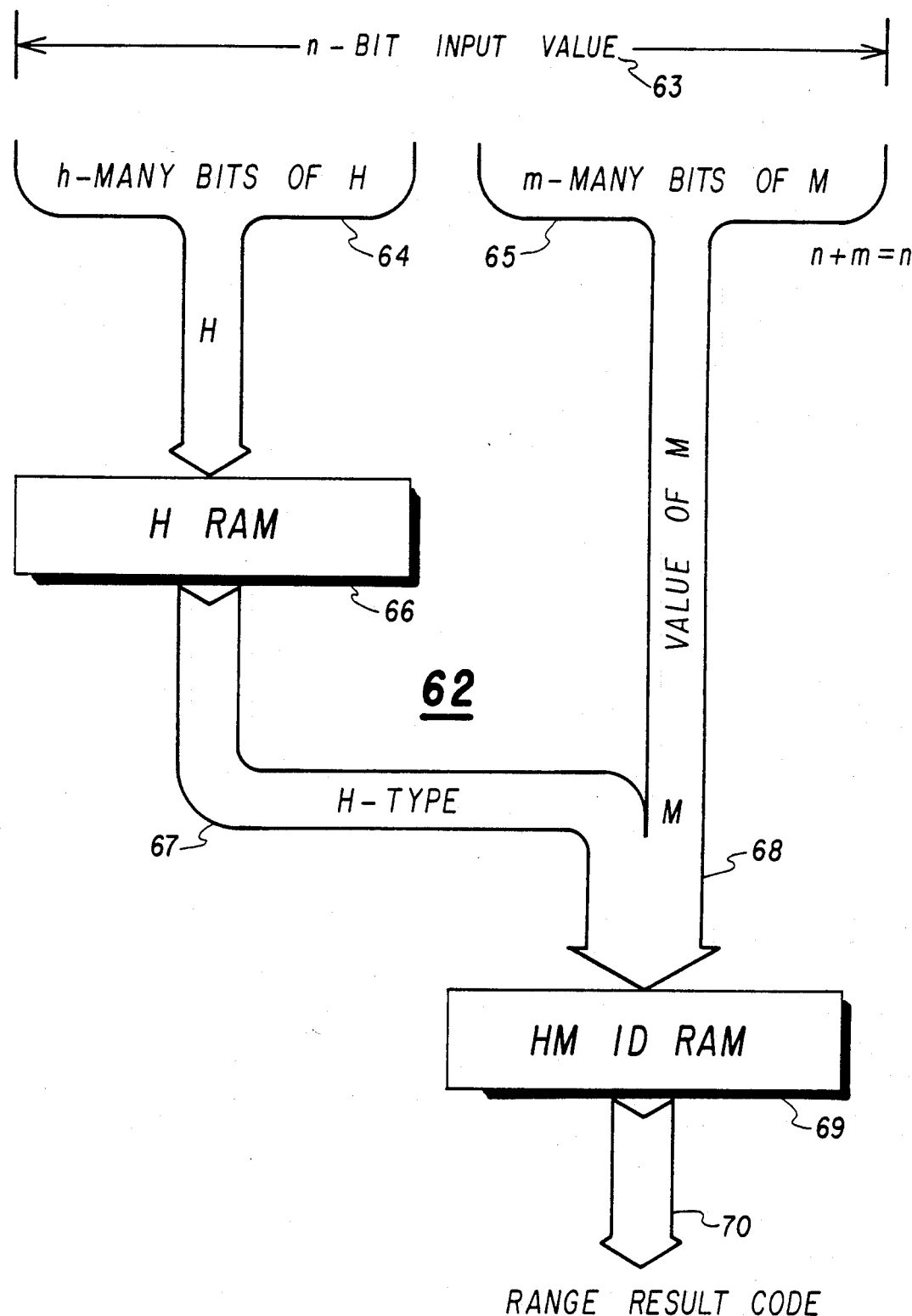
FIG. 10 is a simplified block diagram of a first instance of a third alternate embodiment of the invention.
Figure 11:
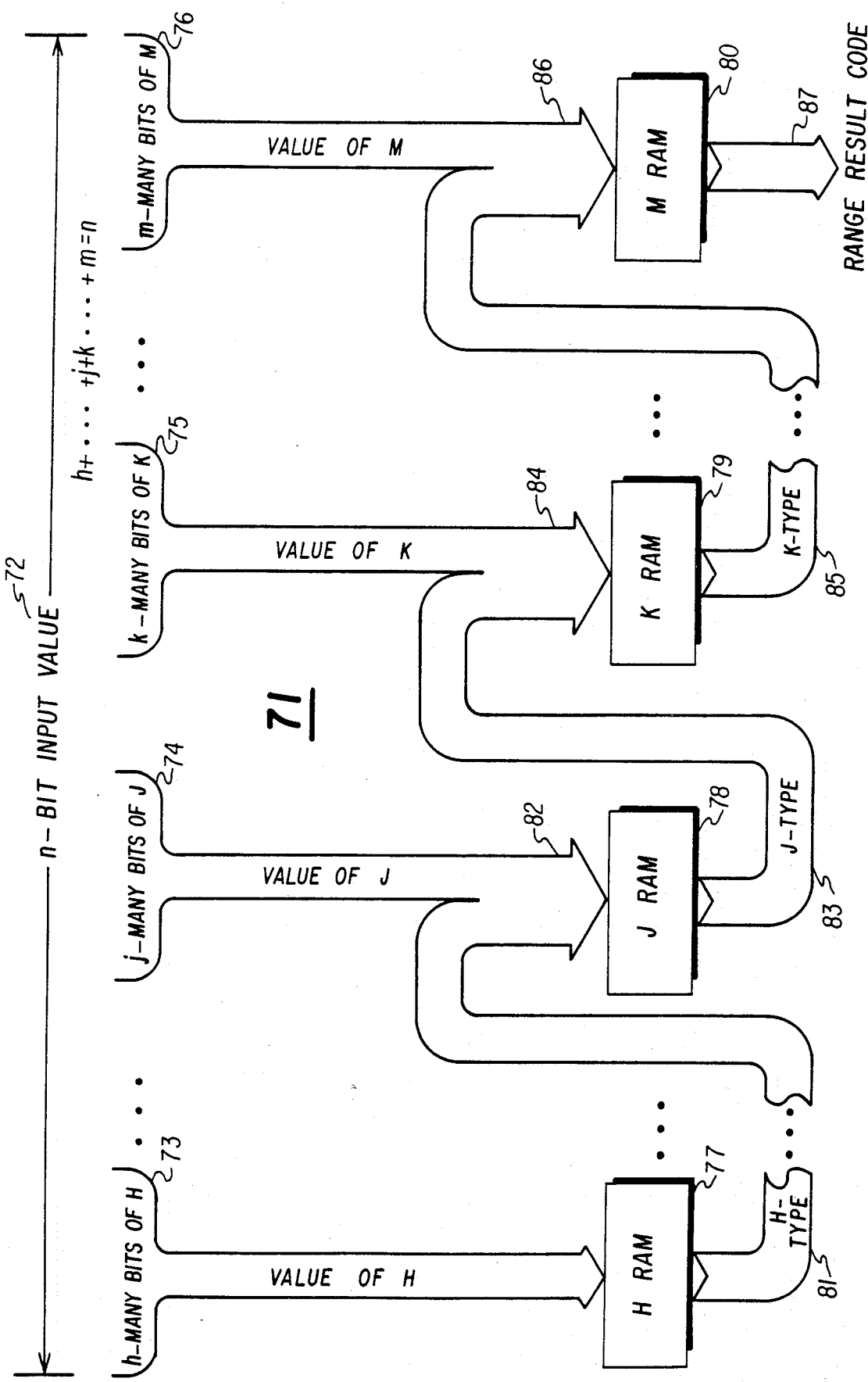
FIG. 11 is a simplified block diagram of a second instance of a third alternate embodiment of the invention.

As a final alternate embodiment, consider the block diagrams 62 and 72 of FIGS. 10 and 11, respectively. We will begin with the simple block diagram 62 of FIG. 10, and then substitute it into itself to produce the more complicated structure of FIG. 11.

Turning now to the block diagram 62 of FIG. 10, an n-bit input value 63 is arbitrarily partitioned into two groups 64 and 65 of h-many and m-many bits, respectively. The h-many bits 64 describe a value H that is applied as an address to an H RAM 66 whose output is an H-type 67. The m-many bits 65 describe a value M which is merged with the H-type 67. The resulting combination 68 is applied as an address to an HM ID RAM 69, which in turn produces a range result code 70. As before, the range result code 70 can be either bit-per-range or range-per-code.

In operation the block diagram of FIG. 10 is similar to that of FIG. 1. The major difference could be characterized as follows. The block diagram 62 of FIG. 10 uses the value of M itself as it's own "M-type", as if the value of K in FIG. 1 were its own K-type. Thus, there is no M-RAM corresponding to the K-RAM 6 of FIG. 1. There is, however, a relative increase in the size of the HM ID RAM 69, compared to the ID RAM 10 of FIG. 1.

A brief example will suffice to illustrate the operation of the block diagram 62 of FIG. 10. Consider again the range $R_1$: $37 \leq HM \leq 54$, defined within the value space zero zero through nine nine. In this example we assume that h=n/2, and that each of H and M describes a decimal digit zero through nine.

H-type=
  a if $0 \leq H \leq 2$;
  b if H=3;
  c if H=4;
  d if H=5; and
  a if $6 \leq H \leq 9$.

TABLE X

| Content of the HM ID RAM needed to describe $R_1$ as H-type versus the value of M. | | | | | | | | | |
|---|---|---|---|---|---|---|---|---|---|
| 0 | 1 | 2 | 3 | 4 | 5 | 6 | 7 | 8 | 9 |

| | 0 | 1 | 2 | 3 | 4 | 5 | 6 | 7 | 8 | 9 |
|---|---|---|---|---|---|---|---|---|---|---|
| a | 0 | 0 | 0 | 0 | 0 | 0 | 0 | 0 | 0 | 0 |
| b | 0 | 0 | 0 | 0 | 0 | 0 | 0 | 1 | 1 | 1 |
| c | 1 | 1 | 1 | 1 | 1 | 1 | 1 | 1 | 1 | 1 |
| d | 1 | 1 | 1 | 1 | 1 | 0 | 0 | 0 | 0 | 0 |

1 = HM is in $R_1$
0 = HM is not in $R_1$

Now consider the block diagram 71 of FIG. 11. An n-bit input value 72 is partitioned into groups of h-many bits 73, . . . , j-many bits 74, k-many bits 75, . . . , and m-many bits 76, each respectively describing integer values H, . . . , J, K, . . . , and M. The value H is applied as an address to an H RAM 77, which in turn produces an H-type 81. The vaklue of J is merged with the preceeding type information and the resulting combination 82 is applied as an address to the J RAM 75, which then produces a J-type 83. The J-type 83 is subsquently merged with the value of K and the combination 84 applied as an address applied to the K RAM 79 to produce a K-type 85. This process continues, until the final type is merged with the value of M to produce a combination 86 that is applied as an address to the M RAM 80. The output of the M RAM 80 is a range result code 87, which as before, could be either bit-per-range or range-per-code.

The block diagram 71 of FIG. 11 can be produced by substituting the block diagram 62 of FIG. 10 into itself an appropriate number of times. The manner of substitution is as follows: Separate the block diagram 62 of FIG. 10 into two portions by breaking the connection between the H-type 67 and the HM ID RAM 69. Now consider a second block diagram 62, but with the following changes in labeling. The "h-many bits of H" becomes "k-many bits of K", the "H RAM" becomes "K RAM", the "H-type" becomes "K-type", the "HM ID RAM" becomes "(HK) RAM", and the "range result code" becomes "(HK)-type". The latter is connected to the original HM ID RAM 69 at the place where the original H-type 67 was merged with the value of M. The original H-type is now merged with the value of K to address the K RAM. The n-bit input value 63 is now divided into three groups representing H, K and M and applied to the appropriate RAM's. This substitution process can be repeated as many times as desired.

To facilitate the encoding of the various RAM's of FIG. 11 the following analysis may be useful. First, consider the n input bits as grouped into K-many most significant bits and whatever remains as grouped into a single collection of at least significant bits. This produces a block diagram similar to that of FIG. 10, but with an unequal division of bits. The needed H-types 81 and the encoding of the H RAM 77 can be found on that basis.

Consider, for example, $R_{13}$: $4237 \leq HJKM \leq 6854$, defined upon a decimal value space of zero zero zero zero through nine nine nine nine. The necessary H-types are:

$H_a$ if $0 \leq H \leq 3$;
$H_b$ if $H = 4$;
$H_c$ if $H = 5$;
$H_d$ if $H = 6$; and
$H_a$ if $7 \leq H \leq 9$.

A useful characterization of these H-types is as follows:

$H_a$ = no, input cannot possibly be in range;
$H_b$ = first maybe, depending upon some first condition;
$H_c$ = yes, input must be in range; and
$H_d$ = second maybe, depending upon some second condition.

For simplicity, we are considering an example with one range. If there were several ranges, subscripted 1, 2, 3, ... then there would be a corresponding increase in the number of H-types. Each of the subscripts a-d would themselves become subscripted with 1, 2, 3, ... . In short, however, it amounts to this. Each range has at most four associated H-types that mean "yes," "no," and two kind of "maybe".

Once H has been traded for its H-type, H and its h-many bits can be ignored while the J RAM 78 operates on the merged combination 82 of the H-types 81 and the value of J. But in a sense this process gets easier the further it goes. For if the H-type indicates a categorical yes or no, the remaining J, K, and M RAM's have no further decisions to make; they need only propagate symbols that continue to represent that categorical decision. The values of J, K and M make no difference.

It is only when the H-type is "maybe" that the value of J is of interest. Now the J-types can be considered, and as before, there are at most four per range. For $R_{13}$ they are:

$J_a$ if $0 \leq J \leq 1$;
$J_b$ if $J = 2$;
$J_c$ if $3 \leq J \leq 7$;
$J_d$ if $J = 8$; and
$J_a$ if $J = 9$.

The characterization of the J-types is similar to the characterization of the H-types:

$J_a$ = no;
$J_b$ = first maybe;
$J_c$ = yes; and
$J_d$ = second maybe.

The encoding of the J-RAM 78 would include the property that an input H-type of $H_a$ forces an output J-type of $J_a$. Likewise, $H_c$ forces $J_c$. Production of $J_b$ and $J_d$ would be contingent upon proper satisfaction by the value of J of a requirement associated with $H_b$ or $H_d$; $H_b$ and $H_d$ without such satisfaction produces $J_a$ (no), which would then propagate (unaltered as to meaning, as it were) all the way through to the range result code 87. An input of $H_b$ or $H_d$ (the maybe's) could also result in $J_c$ (yes), which would also propagate all the way through.

In like manner, the K RAM 79 operates upon the merged combination 84 of J-types and the value of K, passing along the categorical yes's and no's, and refining the maybe's by producing subsequent yes's, no's and maybe's to be used by the adjacent RAM of lesser significance. At the end of the process the encoding of the M RAM 80 is very similar to that for the HM ID RAM 69 of FIG. 10.

THE PREFERRED METHOD OF THE INVENTION

The value space upon which one or more ranges are to be defined is represented as a series of two digit numbers. Each such number is divided into an upper most significant portion J and a lower least significant portion K. The radix of J is the upper radix, while the radix of K is the lower radix. The upper and lower radices may be equal, although that is not necessary.

Ranges to be defined upon the value space are expressed as intervals having endpoints that are such two-digit JK numbers. Likewise, any incoming parameter value to be checked against the ranges is also construed as a JK number.

Once the range or ranges have been defined, certain collections of incoming parameter J-values can have similar properties, insofar as they determine the range result. That is, certain collections of J-values might mean that the associated incoming JK parameter can't possibly be in any range, or must be in a certain range. Indeterminate results ("maybe's") are also possible. Such collections of J-values are identified and represented by aribtrary symbols called J-types.

A maximal number of necessary J-types may be determined by merging and ordering all of the various J-parts of the various range endpoints. That delimits groups of consecutive J-values that can be assigned the same J-type. If the defined ranges are disjoint, then each such group needs its own unique J-type; except that a common J-type meaning "not in any range" may be shared. If the ranges are arbitrary, then the possibility arises that two groups can share a duplicate J-type. This could happen, for instance, where one range is wholly contained within another range, with no shared endpoints.

The various J-types may be interpreted as various "yes's", "no's" and "maybe's", based upon the particular range definitions. The yes's and no's are categorical, in that they require no further qualification. The maybe's, however, also depend upon what value of K accompanies the incoming J-value.

All K-values which supply the same set of answers to the maybe's are grouped together and collectively represented by a single K-type. That is, there are frequently entire groups of incoming K-values that are indistinguishable in their effect. Put another way, if two incoming K-values are to produce different effects then it must be the case that the K-part of at least one endpoint does not lie outside the interval defined by the two different incoming K-values. It is the groups of consecutive values delimited by the merged and ordered set of K-parts of endpoints that receive the K-types.

There may be fewer K-types needed than groups of K-values delimited by the merged and ordered set of K-parts of range endpoints. Some of those groups may have the same set of answers to the maybe's, and can be assigned duplicate K-types.

Once the ranges are defined the necessary corresponding J-types and K-types are determined, and represented by first and second look-up tables or by first and second rules of correspondence. As incoming parameter values to be checked are received they are each construed as pairs of JK digits, and replaced with their associated J- and K-types.

Knowing the J- and K-types of an incoming parameter value is sufficient information to determine exactly which range or combination of ranges the parameter lies within. A third look-up table or third rule of correspondence associates each combination of J- and K-types with the corresponding ranges that will produce those combinations. In this way each incoming parameter value is checked and which range or ranges, if any, the parameter lies within is determined.

In a preferred method high speed static RAM's are used as hardware look-up tables addressed by the J and K portions of the incoming parameter value. The J- and K-types output by these RAM's are merged and applied as an address to a third RAM whose output is an indication of the range or ranges within which the incoming parameter lies. Each of these RAM's is loaded in advance, based upon the specific range or ranges defined upon the value space.

There are various ways that the third rule of correspondence can be structured, or the third look-up table encoded, to represent the range result. In one way, called bit-per-range, the final range result has a bit that corresponds to each range. Simple inspection of the various bits reveals immediately whether or not the incoming parameter lies within the corresponding ranges. Bit-per-range lends itself especially well for use with arbitrary ranges that may overlap in any fashion, or in instances where the fastest possible operation with minimum overhead is desired. In another way, called range-per-code, the various codings possible in the output range result are assigned particular meanings. These meanings are the particular range or combination of ranges that contain the incoming parameter value. Range-per-code is especially useful with many-celled disjoint partitions of the value space, or in other instances where the number of ranges exceeds the number of bits. However, bit-per-range is usable with disjoint ranges, and range-per-code can be used with arbitrary ranges. Further, each can be used in situations where the ranges defined are a mixture of overlapping and disjoint intervals.

There are various alternate methods of the invention that correspond to the alternate embodiments of FIGS. 6, 8, 10, and 11. With the aid of the teachings contained in the preceeding descriptions, a person skilled in the art will understand that the two digit JK method just described can be recursively applied within itself, to produce various IJK and JKL three-digit methods, as well as methods using greater numbers of digits. It is abundantly clear that these further alternate methods fall within the spirit and scope of this disclosure.

DESCRIPTION OF THE APPENDIX

The Appendix following this Description is a PASCAL program "RANGE_DRV" for execution in a system containing the circuit 30 of FIG. 5. As stated earlier, the overall system is a Logic State Analyzer option for an HP 64000 Logic Development System. The HP 64000 has an internal microprocessor and incorporates an operating system for interaction with the user. Each option to the HP 64000 includes not only additional hardware but associated firmware for associated extensions of the basic operating system. The PASCAL program of the Appendix is part of such an extension. What RANGE_DRV does is load the J, K and ID RAM's based on the ranges defined by the user. It uses system R/W memory different from the J, K and ID RAM's during intermediate operations while accomplishing that task.

The program assumes that other portions of the operating system have obtained a definition of each range to be checked and that a selection between bit-per-range and range-per-code has already been made. Not only is the program specifically intended for use with the circuit 30 of FIG. 5, it was written before the J-K terminology was developed. In the context of the program, the J RAM is the "upper RAM," while the K RAM is the "lower RAM." The ID RAM is called the "decode RAM." Also, the term "microrange" refers generally to bit-per-range, while "overview" refers to range-per-code. The program further assumes that the source of the incoming data can be either the logic state currently seen by the Logic State Analyzer or the content of a certain counter whose count increments in a very complex fashion. This counter is the deleted item mentioned in connection with FIGS. 5A-C whose operation is outside the scope of this disclosure.

The purpose of RANGE_DRV is essentially to operate upon the defined ranges and produce the necessary contents of the J, K and ID RAM's for the desired type of bit-per-range or range-per-code type of operation. Once the RAM's are loaded the job of the program is complete, as the necessary details of actually operating the J-K range detector are accomplished by the circuitry itself, as supervised by certain other firmware of the 64000's operating system.

RANGE_DRV requires certain initial input data. A number N indicates the number of ranges, and an associated table contains N pairs of range endpoints. In the table are consecutive pairs of right and left endpoints for the various ranges $R_1, R_2, \ldots$ : $RR_1$ and $LR_1$, $RR_2$ and $LR_2, \ldots$ (Right endpoint Range 1, Left endpoint Range 1, etc.) The name of the table is RANGE, and the entries are each 32-bit values (for implementation reasons relating to the type of microprocessor in the HP 64000 that executes the object code of the program).

The various input data spoken of above are prepared for RANGE_DRV by other firmware in the operating system of the HP 64000. Once RANGE_DRV begins execution it gets the input data and performs the following operations.

First, the endpoints of the various range are construed as two digit integers: $RR_1=J_{R1}K_{R1}$; $LR_1=J_{L1}K_{L1}$; $RR_2=J_{R2}K_{R2}$; etc. That is, the various endpoints are construed in the same J-K fashion as are the incoming parameter value when the J-K range detector is in operation. In this way the endpoints of the user defined ranges and the incoming parameter value are commensurable.

The various $J_{R1}$, $J_{L1}$, $J_{R2}$, $J_{L2}$, ... are used to build a table of values for J versus J-types (called BTABLE). At the same time another table is built relating the arbitrary J-type symbols to the original ranges (called BACK_REFERENCE). Here is the general way in which these tables are constructed.

First, a list is made of all the J-parts of all the user defined endpoints $J_{R1}$, $J_{L1}$, $J_{R2}$, etc., and the associated values of any incoming J that would be of interest. Consider $J_{R1}$ and $J_{R2}$ for a moment. Suppose that they are not two consecutive integers. Then there is a series of one or more interior values of J (i.e., values of J between $J_{R1}$ and $J_{R2}$) that will ultimately be type "yes" for range $R_1$. That series is represented by the smallest of the interior values, which is then added to the list. In special cases where a K-part of zero is associated with an original J-part under consideration, then it is known that such a J-part is not a "maybe" but a "yes". That J-part itself can serve as the lowest of the interior values, and the next higher value is not added to the list. Suppose, for the moment, that $J_{R1}$ is the smallest of all the J-parts for all the endpoints. Unless $J_{R1}$ is zero, then $J_{R1}-1$ is also of interest. That value is not added to the list, however, as the program's logic implicity recognizes a "general purpose 'no'" J-type which is automatically associated with $J_{R1}-1$. (Again, assuming it is $J_{R1}$ that is the smallest of the lot.) Likewise, if, say, $J_{L1}$ were the largest J-part among the endpoints, and if it were less than the maximum possible value for J, then $J_{L1}+1$ is also of interest. But by the same automatic mechanism it too is associated with the "general purpose 'no'" J-type. For the other J-parts that are neither maximums nor minimums, say for $J_{R2}$ and $J_{L2}$, $J_{R2}-1$ and $J_{L2}+1$ are added to the list, along with $J_{R2}$ and $J_{L2}$ themselves, and the lowest of any interior J values between $J_{R2}$ and $J_{L2}$. This process continues until all of the J-parts for each range have been considered. The list may contain redundant entries.

Second, the list is sorted and also compressed by eliminating redundant values. These tasks are performed by a procedure called SORT_COMPRESS. The number of entries remaining in the list is greater than or equal to the number of necessary J-types.

The sorted list is a collection of intervals describing a partition of the value space, formed by merging the endpoints onto a single line representing the value space. Some of those intervals may be alike in the following way. Consider hypothetical ith and nth intervals. It may happen that whenever the input parameter lies within the ith interval it is within the same collection of ranges as when it lies within the nth interval. When this happens the ith and nth intervals can be assigned the same J-type. By inspecting the list to locate such equivalencies (as described in the fourth step below) the number of necessary J-types is reduced to a minimum.

Third, the sorted and compressed list is compared against each range and a second table is prepared that identifies the associated range or ranges for each entry, as well as the role that entry performs in describing the range. This table is generated by a procedure called PROCESS_DATA. Consider some entry in the list. For each range, it might represent one of "yes", "no" or either of two types of "maybe". Original J-parts whose associated K-parts are zero are spotted and set to "yes" in the second table. The second table is used in bulding the ID RAM image after a process similar to the above is performed for finding the K RAM image.

Fourth, starting at the beginning of the list, successive J-type symbols are assigned in their natural order, taking care to use the "general purpose 'no'" wherever needed. As each interval in the sorted and compressed list is considered for its J-type, each of the previous intervals is inspected to see if the current interval should be assigned the same J-type as any previous interval. In this way the number of J-types is kept to the minimum discussed above in connection with the second step.

Fifth, the sorted list is used to build the actual image of the J RAM. That is done by pre-loading the entire image with "general purpose 'no'" and selectively over writing that with the other J-types. For implementation reasons the image of the $1024 \times 4$ J RAM is built and stored as $512 \times 8$ until is is actually transferred to the J RAM.

RANGE_DRV now uses the procedure PROCESS_DATA again to process the collection of range endpoint K-values to produce an image of the K-RAM and another back reference table relating K-types to ranges. The ordered endpoint K-values $K_{R1}$, $K_{L1}$, $K_{R2}$, ... partition the possible values of an incoming K parameter value. The cells of this partition define the number and boundaries of the different K-types. A $512 \times 8$ image of the K-RAM is now built, along with a K back-reference table relating K-types to the ranges requiring them.

Next the procedure PROCESS__—RAM creates an image of the ID RAM by inspecting the images of the J and K RAM's and their associated back reference tables. The J, K and ID RAM images are then transferred to their respective RAM's by the procedure LD_RANGE, after which RANGE_DRV terminates.

The last BEGIN-END pair in RANGE_DRV is the portion of the program that invokes the various other procedures to accomplish the activity just described.

APPENDIX

```
PROGRAM RANGE_DRV;
CONST
   STARTADD=0;
   START=0;
   ENDADD=1;
   STOP=1;
   LSW=0;
   MSW=1;
   NULLSET = [];
TYPE
   ARRAY_2 = ARRAY[LSW..MSW] OF INTEGER;
   ARRAYTYPE1 = ARRAY[0..15] OF
                  ARRAY[STARTADD..ENDADD] OF ARRAY_2;
   ARRAY_4 = ARRAY[0..3] OF INTEGER;
   ARRAY_100 = ARRAY[0..99] OF INTEGER;
   ARRAY_16 = ARRAY[0..15] OF INTEGER;
   ARRAY_32 = ARRAY[0..31] OF INTEGER;
   ARRAY_512 = ARRAY[0..511] OF INTEGER;
   ARRAY_32_2 = ARRAY[0..31] OF ARRAY[0..1] OF INTEGER;
   IBITS = 0..15;
   BITS = SET OF IBITS;
   ARRAY_32S = ARRAY[0..31] OF BITS;
   ARRAY_16S = ARRAY[0..15] OF BITS;
   MODES = (MICRO,OVERVIEW,COUNT,STATE);
   CONTROL = SET OF MODES;
   RANGE_SECTION = (BEGIN_RUN,RUN,END_RUN);
   RANGE_DATA = RECORD
        RANGE_ID:INTEGER;
        RANGE_PART:RANGE_SECTION;
     END;   (*RECORD*)

BACK_REFERENCE = RECORD
        RUN_SET:BITS;
        BEGIN_SET:BITS;
        END_SET:BITS;
     END;   (*RECORD*)

RAMIMAGE = RECORD
        RAM:ARRAY_512;
     END;

DATAPNTR = ^DATARECORD;
   DATARECORD = RECORD
        N:INTEGER;
        RANGE:ARRAYTYPE1;
        POD_LENGTH:INTEGER;
        EXCLUSIVEFLAGS:BITS;
        CONTROLWORD:CONTROL;
     END;

BTABLE = RECORD
        TABLE:ARRAY_32;
        INDEX:INTEGER;
        SEGMENT:ARRAY_32_2;
        SEGMENTINDEX:INTEGER;
        OVERLAY:ARRAY_32S;
        IDTABLE:ARRAY_32;
        SOURCE_RANGE:ARRAY[0..31] OF RANGE_DATA;
        ID_TO_RANGE:ARRAY[0..15] OF BACK_REFERENCE;
        ID:INTEGER;
     END;   (* RECORD *)

VAR

MAXRANGE : ARRAY_2;

PROCEDURE LOC_ABORT(X:INTEGER);EXTERNAL;
PROCEDURE HALT_LOAD;EXTERNAL;
PROCEDURE SLOT(SLOTNUMBER:INTEGER);EXTERNAL;
FUNCTION BINTOGRAY(X:INTEGER):INTEGER;EXTERNAL;
```

```
PROCEDURE PUTBYTE(ADDRESS:INTEGER;VAR A:ARRAY_512;DQ:INTEGER);EXTERNAL;
FUNCTION GETBYTE(ADDRESS:INTEGER;VAR A:ARRAY_512):INTEGER;EXTERNAL;
PROCEDURE BLOCK(VAR LISTELEMENT:ARRAY_2);EXTERNAL;
FUNCTION PARM_XOR(X,Y:INTEGER):INTEGER;EXTERNAL;

FUNCTION ASS_VALS(START_MSW,STOP_MSW,START_LSW,STOP_LSW:INTEGER):INTEGER;
   BEGIN
      IF STOP_MSW = START_MSW
         THEN ASS_VALS := 1

ELSE IF STOP_MSW - START_MSW = 1
                 THEN IF (START_LSW = 0) AND (STOP_LSW = 3FFH)
                         THEN ASS_VALS := 2
                         ELSE ASS_VALS := 3
                 ELSE IF START_LSW = 0
                         THEN IF STOP_LSW = 3FFH
                                 THEN ASS_VALS := 4
                                 ELSE ASS_VALS := 5
                         ELSE IF STOP_LSW = 3FFH
                                 THEN ASS_VALS := 6
                                 ELSE ASS_VALS := 7;
   END;

PROCEDURE COPYIMAGE(RAMPART:INTEGER;VAR P_DS:RAMIMAGE);
   VAR
     I,X:INTEGER;
   BEGIN
     X := SHIFT((MAXRANGE[RAMPART] + 1),-1);
     WITH P_DS DO
       BEGIN
         IF X = 0
           THEN
             BEGIN
               PUTBYTE(1,RAM,GETBYTE(0,RAM));
               X := 1;
             END;
         I := X;
         WHILE I < 512 DO
           BEGIN
             RAM[I] := RAM[I-X];
             I := I + 1;
           END;
       END;
   END;(* OF PROCEDURE COPYIMAGE *)

PROCEDURE SORT_COMPRESS(VAR A:ARRAY_32;VAR N:INTEGER);
   VAR
     I,J,MIN:INTEGER;
     TEMP:INTEGER;
   BEGIN
     N := N - 1;
     FOR I := 0 TO (N - 1) DO
       BEGIN
         MIN := I;
         FOR J := (I + 1) TO N DO
           IF A[J] < A[MIN] THEN MIN := J;
         IF I <> MIN
           THEN BEGIN
             TEMP := A[I];
             A[I] := A[MIN];
             A[MIN] := TEMP;
           END;
       END;
     I := 0;
     WHILE I < N DO
       IF A[I] = A[I + 1]
         THEN BEGIN
           FOR J := I TO (N - 1) DO
             A[J] := A[J + 1];
           N := N - 1;
         END
         ELSE I := I+1;
     IF N > 16 THEN LOC_ABORT(25);
   END;
```

```
PROCEDURE PROCESS_DATA(VAR P_WRKFILE:BTABLE;VAR P_RAM:RAMIMAGE);
  VAR
    I,J,L,ENTRE,FINI:INTEGER;
    NSEGMENTS:INTEGER;
    OVERLAY_TO_RANGE:BACK_REFERENCE;
  BEGIN
    WITH P_WRKFILE DO
      BEGIN
        ID := 0;
        FOR I := 0 TO (INDEX - 1) DO
          BEGIN
            ENTRE := TABLE[I];
            FINI := TABLE[(I + 1)];
            NSEGMENTS := SEGMENTINDEX - 1;
            OVERLAY[I] := [];
            OVERLAY_TO_RANGE.RUN_SET := [];
            OVERLAY_TO_RANGE.END_SET := [];
            OVERLAY_TO_RANGE.BEGIN_SET := [];
            FOR J := 0 TO NSEGMENTS DO
              BEGIN
                IF (ENTRE >= SEGMENT[J][START]) AND (FINI <= (SEGMENT[J][STOP] + 1))
                  THEN WITH OVERLAY_TO_RANGE,SOURCE_RANGE[J] DO
                    BEGIN
                      OVERLAY[I] := [J] + OVERLAY[I];
                      CASE RANGE_PART OF
                        RUN       :RUN_SET := [RANGE_ID] + RUN_SET;
                        BEGIN_RUN:BEGIN_SET := [RANGE_ID] + BEGIN_SET;
                        END_RUN   :END_SET := [RANGE_ID] + END_SET;
                        OTHERWISE;
                      END; (*CASE*)
                    END;
              END;

IF OVERLAY[I] <> []
              THEN BEGIN
                IDTABLE[I] := ID;
                IF I > 0
                  THEN BEGIN
                    FOR L := 0 TO (I - 1) DO
                      IF OVERLAY[L] = OVERLAY[I]
                        THEN IDTABLE[I] := IDTABLE[L];
                    IF IDTABLE[I] = ID
                      THEN BEGIN
                        ID := ID + 1;
                        IDTABLE[I] := ID;
                      END;
                  END;
                FOR L := ENTRE TO (FINI - 1) DO PUTBYTE(L,P_RAM.RAM,IDTABLE[I]);
                ID_TO_RANGE[IDTABLE[I]] := OVERLAY_TO_RANGE;
              END;
          END;
      END;   (*WITH P_WRKFILE*)
  END;       (*OF PROCEDURE PROCESS_DATA*)

PROCEDURE ASSIGN_SEGMENT(ITH,ENTRE,FINI:INTEGER; RANGE_ELEMENT:RANGE_SECTION;
                    VAR P_WRKFILE:BTABLE);
  BEGIN
    WITH P_WRKFILE DO
      BEGIN
        SEGMENT[SEGMENTINDEX][START] := ENTRE;
        SEGMENT[SEGMENTINDEX][STOP] := FINI;
        WITH SOURCE_RANGE[SEGMENTINDEX] DO
          BEGIN
            RANGE_ID := ITH;
            RANGE_PART := RANGE_ELEMENT;
          END;
        SEGMENTINDEX := SEGMENTINDEX + 1;
      END;
  END; (* OF PROCEDURE ASSIGN_SEGMENT *)

PROCEDURE PROCESS_U_RAM(VAR PU:DATARECORD;VAR PU_WRKFILE:BTABLE;
                    VAR PU_DS:RAMIMAGE);
  VAR
    I:INTEGER;
```

```
PROCEDURE ASSIGN_URAM_ID(ITH:INTEGER);
  VAR
    START_MSW,START_LSW,STOP_MSW,STOP_LSW:INTEGER;
  BEGIN
    START_MSW := PU.RANGE[ITH][START][MSW];
    START_LSW := PU.RANGE[ITH][START][LSW];
    STOP_MSW  := PU.RANGE[ITH][STOP][MSW];
    STOP_LSW  := PU.RANGE[ITH][STOP][LSW];

WITH PU_WRKFILE DO
      CASE ASS_VALS(START_MSW,STOP_MSW,START_LSW,STOP_LSW) OF

1: BEGIN
          TABLE[INDEX    ] := START_MSW;
          TABLE[INDEX + 1] := START_MSW + 1;
          INDEX := INDEX + 2;
          ASSIGN_SEGMENT(ITH,START_MSW,START_MSW,BEGIN_RUN,PU_WRKFILE);
         END;

2,4: BEGIN
          TABLE[INDEX    ] := START_MSW;
          TABLE[INDEX + 1] := STOP_MSW+1;
          INDEX := INDEX + 2;
          ASSIGN_SEGMENT(ITH,START_MSW,STOP_MSW,RUN,PU_WRKFILE);
         END;

3: BEGIN
          TABLE[INDEX    ] := START_MSW;
          TABLE[INDEX + 1] := STOP_MSW;
          TABLE[INDEX + 2] := STOP_MSW + 1;
          INDEX := INDEX + 3;
          ASSIGN_SEGMENT(ITH,START_MSW,START_MSW,BEGIN_RUN,PU_WRKFILE);
          ASSIGN_SEGMENT(ITH,STOP_MSW,STOP_MSW,END_RUN,PU_WRKFILE);
         END;

5: BEGIN
          TABLE[INDEX    ] := START_MSW;
          TABLE[INDEX + 1] := STOP_MSW;
          TABLE[INDEX + 2] := STOP_MSW + 1;
          INDEX := INDEX + 3;
          ASSIGN_SEGMENT(ITH,START_MSW,STOP_MSW-1,RUN,PU_WRKFILE);
          ASSIGN_SEGMENT(ITH,STOP_MSW,STOP_MSW,END_RUN,PU_WRKFILE);
         END;

6: BEGIN
          TABLE[INDEX    ] := START_MSW;
          TABLE[INDEX + 1] := START_MSW + 1;
          TABLE[INDEX + 2] := STOP_MSW + 1;
          INDEX := INDEX + 3;
          ASSIGN_SEGMENT(ITH,START_MSW,START_MSW,BEGIN_RUN,PU_WRKFILE);
          ASSIGN_SEGMENT(ITH,START_MSW+1,STOP_MSW,RUN,PU_WRKFILE);
         END;

7: BEGIN
          TABLE[INDEX    ] := START_MSW;
          TABLE[INDEX + 1] := START_MSW + 1;
          TABLE[INDEX + 2] := STOP_MSW;
          TABLE[INDEX + 3] := STOP_MSW + 1;
          INDEX := INDEX + 4;
          ASSIGN_SEGMENT(ITH,START_MSW,START_MSW,BEGIN_RUN,PU_WRKFILE);
          ASSIGN_SEGMENT(ITH,START_MSW + 1,STOP_MSW - 1,RUN,PU_WRKFILE);
          ASSIGN_SEGMENT(ITH,STOP_MSW,STOP_MSW,END_RUN,PU_WRKFILE);
         END;
      OTHERWISE;
    END;  (*CASE*)
  END;(* OF PROCEDURE ASSIGN_URAM_ID *)
BEGIN (* PROCEDURE PROCESS_URAM *)
  FOR I := 0 TO (PU.N - 1) DO
    ASSIGN_URAM_ID(I);
  SORT_COMPRESS(PU_WRKFILE.TABLE,PU_WRKFILE.INDEX);
  PROCESS_DATA(PU_WRKFILE,PU_DS);
END; (* OF PROCEDURE PROCESS_URAM *)

PROCEDURE PROCESS_L_RAM(VAR PL:DATARECORD;VAR PL_WRKFILE:BTABLE;VAR PL_DS:RAMIMAGE);
  VAR
```

```
   I,J:INTEGER;

(* PROCEDURE ASSIGN_LRAM_ID ASSIGNS LOCATION IDS TO THE LOWER
   RAM IMAGE BASED ON A SEQUENTIAL ASSIGNMENT AND COMPARISON
   OF PREVIOUS OVERLAY WORDS.  THE ROUTINE HANDLES UP TO
   8 OVERLAPPING RANGES (16 OVERLAPPING SEGMENTS OR POINTS)
   FOR EACH RANGE ELEMENT.  THE ROUTINE IS CALLED AFTER THE
   ORIGINAL RANGE BOUNDARY LIST HAS BEEN SORTED AND COMPRESSED   *)

PROCEDURE ASSIGN_LRAM_ID(ITH:INTEGER);
  VAR
     START_MSW,START_LSW,STOP_MSW,STOP_LSW:INTEGER;
  BEGIN
     START_MSW := PL.RANGE[ITH][START][MSW];
     START_LSW := PL.RANGE[ITH][START][LSW];
     STOP_MSW  := PL.RANGE[ITH][STOP][MSW];
     STOP_LSW  := PL.RANGE[ITH][STOP][LSW];

WITH PL_WRKFILE DO
        CASE ASS_VALS(START_MSW,STOP_MSW,START_LSW,STOP_LSW) OF

1: BEGIN
              TABLE[INDEX    ] := START_LSW;
              TABLE[INDEX + 1] := STOP_LSW + 1;
              INDEX := INDEX + 2;
              ASSIGN_SEGMENT(ITH,START_LSW,STOP_LSW,BEGIN_RUN,PL_WRKFILE);
           END;

2,4: BEGIN
              TABLE[INDEX    ] := 0;
              TABLE[INDEX + 1] := MAXRANGE[LSW] + 1;
              INDEX := INDEX + 2;
              ASSIGN_SEGMENT(ITH,0,MAXRANGE[LSW],BEGIN_RUN,PL_WRKFILE);
           END;

3,7: BEGIN
              TABLE[INDEX    ] := 0;
              TABLE[INDEX + 1] := STOP_LSW + 1;
              TABLE[INDEX + 2] := START_LSW;
              TABLE[INDEX + 3] := MAXRANGE[LSW] + 1;
              INDEX := INDEX + 4;
              ASSIGN_SEGMENT(ITH,0,STOP_LSW,END_RUN,PL_WRKFILE);
              ASSIGN_SEGMENT(ITH,START_LSW,MAXRANGE[LSW],BEGIN_RUN,PL_WRKFILE);
           END;

5: BEGIN
              TABLE[INDEX    ] := 0;
              TABLE[INDEX + 1] := STOP_LSW + 1;
              TABLE[INDEX + 2] := MAXRANGE[LSW] + 1;
              INDEX := INDEX + 3;
              ASSIGN_SEGMENT(ITH,0,MAXRANGE[LSW],BEGIN_RUN,PL_WRKFILE);
              ASSIGN_SEGMENT(ITH,0,STOP_LSW,END_RUN,PL_WRKFILE);
           END;

6: BEGIN
              TABLE[INDEX    ] := 0;
              TABLE[INDEX + 1] := START_LSW;
              TABLE[INDEX + 2] := MAXRANGE[LSW] + 1;
              INDEX := INDEX + 3;
              ASSIGN_SEGMENT(ITH,START_LSW,MAXRANGE[LSW],BEGIN_RUN,PL_WRKFILE);
              ASSIGN_SEGMENT(ITH,0,MAXRANGE[LSW],END_RUN,PL_WRKFILE);
           END;

OTHERWISE;
           END;   (* CASE *)
     END;(* OF PROCEDURE ASSIGN_LRAM_ID *)
  BEGIN (* OF PROCEDURE PROCESS_LRAM *)
     FOR I := 0 TO (PL.N - 1) DO
        ASSIGN_LRAM_ID(I);
     SORT_COMPRESS(PL_WRKFILE.TABLE,PL_WRKFILE.INDEX);
     PROCESS_DATA(PL_WRKFILE,PL_DS);
  END; (* OF PROCEDURE PROCESS_LRAM *)

PROCEDURE PROCESS_D_RAM(VAR PD:DATARECORD;VAR UP_DATA,LP_DATA:BTABLE;
                          VAR PD_DS:RAMIMAGE);
```

```
PROCEDURE POST_PROCESS_DECODE;
  VAR
    I:INTEGER;
  BEGIN
    WITH PD_DS,PD DO
      IF EXCLUSIVEFLAGS <> [ ]
        THEN FOR I := 0 TO 255 DO
            RAM[I] := PARM_XOR(RAM[I],INTEGER(EXCLUSIVEFLAGS));
  END;
PROCEDURE LOAD_DECODE_RAM;
  VAR
    LAST_UPPER_ID,LAST_LOWER_ID:INTEGER;
    I,J,K:INTEGER;
    BEGIN_INTERSECT,END_INTERSECT:BITS;
    UPPER_RUN_SET,UPPER_BEGIN_SET,UPPER_END_SET:BITS;
  PROCEDURE ASSIGN_DECODE(UPPERID,LOWERID,RANGEID:INTEGER);
    VAR
      ID,INDEX:INTEGER;
      TESTBIT:BITS;
    BEGIN (* OF PROCEDURE ASSIGN_DECODE *)
      INDEX := SHIFT(UPPERID,4) + LOWERID;
      IF MICRO IN PD.CONTROLWORD
        THEN BEGIN
            TESTBIT := [RANGEID];
            ID := INTEGER(TESTBIT);
            WITH PD_DS DO RAM[INDEX] := RAM[INDEX] + ID;
            END
        ELSE PD_DS.RAM[INDEX] := RANGEID;
    END;(* OF PROCEDURE ASSIGN_DECODE *)
    BEGIN (* OF PROCEDURE LOAD_DECODE_RAM *)
      LAST_UPPER_ID := UP_DATA.ID;
      LAST_LOWER_ID := LP_DATA.ID;
      FOR I := 0 TO LAST_UPPER_ID DO
        WITH UP_DATA.ID_TO_RANGE[I] DO
          BEGIN
            UPPER_RUN_SET := RUN_SET;
            UPPER_BEGIN_SET := BEGIN_SET;
            UPPER_END_SET := END_SET;
            FOR J := 0 TO PD.N DO
              IF J IN UPPER_RUN_SET
                THEN FOR K := 0 TO LAST_LOWER_ID DO ASSIGN_DECODE(I,K,J)
                ELSE FOR K := 0 TO LAST_LOWER_ID DO
                  WITH LP_DATA.ID_TO_RANGE[K] DO
                    BEGIN
                      BEGIN_INTERSECT := BEGIN_SET * UPPER_BEGIN_SET;
                      END_INTERSECT := END_SET * UPPER_END_SET;
                      IF J IN (BEGIN_INTERSECT + END_INTERSECT)
                        THEN ASSIGN_DECODE(I,K,J);
                    END;
          END;
    END;(* OF PROCEDURE LOAD_DECODE_RAM *)
  BEGIN (* OF PROCEDURE PROCESS_DECODE_RAM *)
    LOAD_DECODE_RAM;
    POST_PROCESS_DECODE;
  END; (* OF PROCEDURE PROCESS_DECODE_RAM *)

PROCEDURE INITIALIZE(INPUT_POINTER:DATAPNTR;VAR INPUT_COPY:DATARECORD);
  VAR
    I,LABELEND:INTEGER;
  BEGIN
    INPUT_COPY := INPUT_POINTER^;
    LABELEND :=INPUT_COPY.POD_LENGTH;
    WITH INPUT_COPY DO
      FOR I := 0 TO (N - 1) DO
        BEGIN
          BLOCK(RANGE[I][START]);
          BLOCK(RANGE[I][STOP]);
        END;
      IF LABELEND < 11
        THEN BEGIN
          MAXRANGE[MSW] := 0;
          MAXRANGE[LSW] := SHIFT(1,LABELEND) - 1;
        END
```

```
        ELSE BEGIN
          MAXRANGE[MSW] := SHIFT(1,(LABELEND - 10)) - 1;
          MAXRANGE[LSW] := 03FFH;
        END;
  END;

PROCEDURE INITIATE_DS(P_INPUT:DATAPNTR;VAR UBND,LBND:BTABLE;
                      VAR ILWR,IUPR:RAMIMAGE;VAR DCODE:RAMIMAGE);
  VAR
    I:INTEGER;
  BEGIN
    LBND.SEGMENTINDEX := 0;
    LBND.INDEX := 0;
    UBND.SEGMENTINDEX := 0;
    UBND.INDEX := 0;
    FOR I := 0 TO 511 DO
      BEGIN
        IUPR.RAM[I] := 0F0FH;
        ILWR.RAM[I] := 0F0FH;
      END;
    IF MICRO IN P_INPUT^.CONTROLWORD
      THEN FOR I := 0 TO 255 DO DCODE.RAM[I] := 0
      ELSE FOR I := 0 TO 255 DO DCODE.RAM[I] := 0FH;
  END;

PROCEDURE RANGE_LD(ACQ_SLOT,CONTROL_SLOT:INTEGER;VAR UPR,LWR:RAMIMAGE;
                   VAR DECODE:RAMIMAGE;VAR P_INPUT:DATARECORD);
CONST
  CONTROLWORD_ADDRS   = 06816H;
  LOWER_RAM_ADDRS     = 0680EH;
  LOWER_RAM_I_ADDRS   = 0580EH;
  UPPER_RAM_ADDRS     = 0680FH;
  DECODE_RAM_ADDRS    = 0680DH;
  SEQ_STATE_REG_ADDRS = 04800H;
  SEQ_RAM_LOWER_ADDRS = 04B00H;
TYPE
  P = ^INTEGER;
VAR
  CONTROLWORD,LOWER_RAM,LOWER_RAM_I,
  UPPER_RAM,DECODE_RAM,SEQ_STATE_REG,
  SEQ_RAM_LOWER:P;
  X,I,J,Q,Y:INTEGER;
BEGIN
  CONTROLWORD   := P(CONTROLWORD_ADDRS);
  LOWER_RAM     := P(LOWER_RAM_ADDRS);
  LOWER_RAM_I   := P(LOWER_RAM_I_ADDRS);
  UPPER_RAM     := P(UPPER_RAM_ADDRS);
  DECODE_RAM    := P(DECODE_RAM_ADDRS);
  SEQ_STATE_REG := P(SEQ_STATE_REG_ADDRS);
  SEQ_RAM_LOWER := P(SEQ_RAM_LOWER_ADDRS);

HALT_LOAD;
  SLOT(ACQ_SLOT);
  CONTROLWORD^ := 040H;
  FOR I := 0 TO 15 DO
    BEGIN
      UPPER_RAM^ := I;
      Q := SHIFT(I,4);
      FOR J := 0 TO 15 DO
        BEGIN
          LOWER_RAM^ := J;
          DECODE_RAM^ := DECODE.RAM[Q+J];
        END;
    END;
  SLOT(CONTROL_SLOT);
  SEQ_STATE_REG^ := 0;
  SEQ_RAM_LOWER^ := 080H;
  SEQ_RAM_LOWER^ := 0H;
  SLOT(ACQ_SLOT);

IF STATE IN P_INPUT.CONTROLWORD
    THEN BEGIN
      FOR I := 0 TO 341 DO LOWER_RAM_I^ := 0;
      FOR I := 0 TO 03FFH DO
```

```
        BEGIN
            X := BINTOGRAY(I);
            UPPER_RAM^ := GETBYTE(X,UPR.RAM);
            LOWER_RAM_I^ := GETBYTE(X,LWR.RAM);
        END;
    END;

IF COUNT IN P_INPUT.CONTROLWORD
        THEN BEGIN
            FOR I := 0 TO 341 DO
                BEGIN
                    UPPER_RAM^ := GETBYTE(I,UPR.RAM);
                    LOWER_RAM_I^ := -1;
                END;
            FOR I := 342 TO 1023 DO
                BEGIN
                    UPPER_RAM^ := GETBYTE(I,UPR.RAM);
                    LOWER_RAM_I^ := GETBYTE(I-342,LWR.RAM);
                END;
            FOR I := 1024 TO 1024+341 DO
                LOWER_RAM_I^ := GETBYTE(I-342,LWR.RAM);
        END;
END;

$GLOBPROC+$
PROCEDURE LOAD_RANGE(ACQSLOT,CNTLSLOT:INTEGER; POINTER_TO_DATA:DATAPNTR);
    (* THE VARIABLES FOR LOAD_RANGE ARE DEFINED IN THE
       GLOBAL SPECIFICATIONS AT THE PROGRAM LEVEL    *)
    VAR
    $EXTVAR+$
        L_BOUND,U_BOUND:BTABLE;
        PR:DATARECORD;
        UPR,LWR,DECODE:RAMIMAGE;
    $EXTVAR-$
BEGIN
    INITIATE_DS(POINTER_TO_DATA,U_BOUND,L_BOUND,LWR,UPR,DECODE);
    INITIALIZE(POINTER_TO_DATA,PR);
    PROCESS_U_RAM(PR,U_BOUND,UPR);
    PROCESS_L_RAM(PR,L_BOUND,LWR);
    IF MAXRANGE[MSW] < 03FFH
        THEN COPYIMAGE(MSW,UPR);
    IF MAXRANGE[LSW] < 03FFH
        THEN COPYIMAGE(LSW,LWR);
    PROCESS_D_RAM(PR,U_BOUND,L_BOUND,DECODE);
    RANGE_LD(ACQSLOT,CNTLSLOT,UPR,LWR,DECODE,PR);
END;
$GLOBPROC-$
```

We claim:

1. A method of addressing memories to determine if a parameter value lies within a range defined upon an ordered collection of m·n discrete values for the digital signals, comprising the steps of:

representing instances of the m·n discrete values of the digital signals in the form of two digits J and K, where J represents the most significant portion of the value and the radix of J is m, and where K represents the remaining least significant portion of the value and the radix of K is n;

dividing the digital signals into a most significant group representing J and a least significant group representing K;

representing the left and right endpoints of the range as the JK pairs $J_L K_L$ and $J_R K_R$, respectively;

partitioning the m-many values of J into groups delimited by $J_L$ and $J_R$;

assigning J-types to the groups of J-values to distinguish the various ways those groups affect whether or not the parameter value lies within the range;

storing the assigned J-types in a first memory means addressed by the most significant group of digital signals;

partitioning the n-many values of K into groups delimited by $K_L$ and $K_R$;

assigning K-types to the groups of K-values to distinguish the various ways those groups affect whether or not the parameter value lies within the range;

storing the assigned K-types in a second memory means addressed by the least significant group of digital signals;

finding in the first memory means the assigned J-type associated with the J portion of a parameter value;

finding in the second memory means the assigned K-type associated with the K portion of that same parameter value; and indicating whether or not the parameter value lies within the range, based upon the particular combination of the J-type and K-type resulting from the two finding steps above.

2. A method of addressing memories with digital signals to determine which range or combination of a plurality of ranges R1, R2 . . . defined upon an ordered collection of m·n discrete values for the digital signals contains an applied parameter value, comprising the steps of:

representing instances of the m·n discrete values of the digital signals in the form of two digits J and K, where J represents the most significant portion of the value and the radix of J is m, and where K represents the remaining least significant portion of the value and the radix of K is n;

dividng the digital signals into a most significant group representing J and a least significant group representing K;

representing the left endpoints of the plurality of ranges as the pluraity of JK pairs $J_{L1} K_{L1}$, $J_{L2} K_{L2}$, and so forth for each range;

representing the right endpoints of the plurality of ranges as the plurality of JK pairs $J_{R1} K_{R1}$, $J_{R2} K_{R2}$, and so forth for each range;

partitioning the m-many values of J into groups delimited by $J_{L1}$, $J_{L2}$ and so forth, and also by $J_{R1}$, $J_{R2}$ and so forth;

assigning J-types to the groups of J-values to distinguish the various ways those groups affect which range or combination of ranges contains the parameter value;

storing the assigned J-types in a first memory means addressed by the most significant group of digital signals;

partitioning the n-many values of K into groups delimited by $K_{L1}$, $K_{L2}$ and so forth, and also by $K_{R1}$, $K_{R2}$ and so forth;

assigning K-types to the groups of K-values to distinguish the various ways those groups affect which range or combination of ranges contains the parameter value;

storing the assigned K-types in a second memory means addressed by the least significant group of digital signals;

finding in the first memory means the assigned J-type associated with the J portion of an applied parameter value;

finding in the second memory means the assigned K-type associated with the K portion of that same parameter value; and indicating whether or not the parameter value lies within a range or combination of ranges, based upon the particular combination of the J-type and K-type resulting from the two finding steps above.

3. A method as in claim 2 wherein the indicating step produces an indication having a separate bit for each of the ranges R1, R2 . . . , and wherein those separate bits independently indicate whether or not the parameter value lies within the associated range.

4. A method as in claim 2 wherein the indicating step produces an indication having fewer bits than a maximum number of ranges and wherein those bits are encoded to represent the particular range or combination of ranges the parameter value lies within.

5. A méthod as in claim 2 wherein the step of assigning J-types assigns the same J-type to groups of J-values whose respective range results always equal each other when, for all values of K, those groups of J-values are taken with the same K-value.

6. A method as in claim 2 wherein the step of assigning K-types assigns the same K-type to groups of K-values whose respective range results always equal each other when, for all values of J, those groups of K-values are taken with the same J-value.

7. A method of addressing memories to determine if a parameter value represented by digital signals lies within a range defined upon an ordered collection of l·m·n discrete values for the digital signals, comprising the steps of:

representing instances of the l·m·n discrete values of the digital signals in the form of three digits I, J and K, where the radix of I is l, the radix of J is m and the radix of K is n;

dividing the digital signals into a most significant group representing I, a central significant group representing J and the least significant group representing K;

representing the left and right endpoints of the range as the IJK triples $I_L J_L K_L$ and $I_R J_R K_R$, respectively;

partitioning the l-many values of I into groups delimited by $I_L$ and $I_R$;

assigning I-types to the groups of I-values to distinguish the various ways those groups affect whether or not the parameter value lies within the range;

storing the assigned I-types in a first memory means addressed by the most significant group of digital signals;

partitioning the m-many values of J into groups delimited by $J_L$ and $J_R$;

assigning J-types to the groups of J-values to distinguish the various ways those groups affect whether or not the parameter value lies within the range;

storing the assigned J-types in a second memory means addressed by the central significant group of digital signals;

partitioning the n-many values of K into groups delimited by $K_L$ and $K_R$;

assigning K-types to the groups of K-values to distinguish the various ways those groups affect whether or not the parameter value lies within the range;

storing the assigned K-types in a third memory means addressed by the least significant group of digital signals;

finding in the first memory means the assigned I-type associated with the I-portion of an applied parameter value;

finding in the second memory means the assigned J-type associated with the J-portion of that same parameter value;

finding in the third memory means the assigned K-type associated with the K-portion of that same parameter value;

partitioning the (m·n)-many values of J taken with K into groups of (JK) values delimited by the various (JK) combinations that occur in the left and right endpoints of the range;

assigning (JK)-types to the groups of (JK) values to distinguish the various ways those groups affect whether or not the parameter value lies within the range;

storing the assigned (JK)-types in a fourth memory means addressed by the J-types and K-types found in the second and third memory means, respectively;

finding in the fourth memory means the assigned (JK)-type associated with the (JK)-portion of that same parameter value, based upon the above steps of finding the J-type and finding the K-type; and indicating whether or not the parameter value lies within the range, based upon the particular combination of the I-type and the (JK)-type resulting from their associated finding steps above.

8. A method as in claim 7 wherein a plurality of ranges are defined upon the ordered collection, the indicating step produces an indication having a separate bit for each of the ranges in the plurality and wherein those separate bits independently indicate whether or not the parameter value lies within the associated ranges.

9. A method as in claim 7 wherein a plurality of ranges are defined upon the ordered collection, the indicating step produces an indication having fewer bits than a maximum number of ranges and wherein those bits are encoded to represent which, if any, particular range or combination of ranges the parameter value lies within.

10. A method of addressing memories to determine if a parameter value represented by digital signals lies within a range defined upon an ordered collection of l·m·n discrete values for the digital signals, comprising the steps of:
representing instances of the l·m·n discrete values in the form of three digits I, J and K, where I represents the most significant portion of the value and the radix of I is l, where J represents the central significant portion of the value and the radix of J is m, and where K represents the remaining least significant portion of the value and the radix of K is n;
dividing the digital signals into a not significant group representing I, a central significant group representing J and a least significant group representing K;
representing the left and right endpoints of the range as the IJK triples $I_L J_L K_L$ and $I_R J_R K_R$, respectively;
partitioning the l-many values of I into groups delimited by $I_L$ and $I_R$;
assigning I-types to the groups of I-values to distinguish the various ways those groups affect whether or not the parameter value lies within the range;
storing the assigned I-types in a first memory means addressed by the most significant group of digital signals;
partitioning the m-many values of J into groups delimited by $J_L$ and $J_R$;
assigning J-types to the groups of J-values to distinguish the various ways those groups affect whether or not the parameter value lies within the range;
storing the assigned J-types in the second memory means addressed by the central significant group of digital signals;
partitioning the n-many values of K into groups delimited by $K_L$ and $K_R$;
assigning K-types to the groups of K-values to distinguish the various ways those groups affect whether or not the parameter value lies within the range;
storing the assigned K-types in a third memory means addressed by the least significant group of digital signals;
finding in the first memory means the assigned I-type associated with the I-portion of an applied parameter value;
finding in the second memory means the assigned J-type associated with the J-portion of that same parameter value;
finding in the third memory means the assigned K-type associated with the K-portion of that same parameter value; and
indicating whether or not the parameter value lies within the range, based upon the particular combination of the I-type, J-type and K-type resulting from the three finding steps above.

11. A method as in claim 10 wherein a plurality of ranges are defined upon the ordered collection, the indicating steps produces an indication having a separate bit for each of the ranges in the plurality and wherein those separate bits independently indicate whether or not the parameter value lies within the associated range.

12. A method as in claim 10 wherein a plurality of ranges are defined upon the ordered collection, the indicating step produces an indication having fewer bits than a maximum number of ranges and wherein those bits are encoded to represent which, if any, particular range or combination of ranges the parameter value lies within.

13. A method of addressing memories to determine a range result indicating if the value of an (m+n)-many bit value lies within a range defined upon a value space of m+n bits representing $2^{(m+n)}$ discrete values, comprising the steps of:
representing instances of the $2^{(m+n)}$ discrete values in the form of two digits J and K, where the radix of J is $2^m$ and the radix of K is $2^n$;
dividing an applied parameter into a J portion corresponding to m-many most significant bits and a K portion corresponding to n-many least significant bits;
representing the left and right endpoints of the range as the JK pairs $J_L K_L$ and $J_R K_R$, respectively;
partitioning the $2^m$ values of J into categorical and indeterminate J-groups delimited by $J_L$ and $J_R$, the categorical J-groups being those J-values for which the range result is immediately determined by J without further recourse to the value of K, and the indeterminate J-groups being those J-values for which the value of K matters in determining the range result;
assigning J-types to the J-groups to represent categorical yes's, no's and indeterminate maybe's among the J-groups;
storing the assigned J-types in a first memory means addressed by the m-many most significant bits of the applied parameter;
finding in the first memory the assigned J-type associated with the J-portion of the applied parameter;
partitioning the $2^n$ values of K into K-groups delimited by $K_L$ and $K_R$;
assigning K-types to the cartesian product of the J-types taken with the K-groups to represent the various possible range results, each element of this cartesian product including a categorical yes J-type being assigned a range result indicating that the parameter value lies within the range, each element including a categorical no J-type producing a range result indicating that the parameter value lies outside the range, and each element including an indeterminate J-type producing an appropriate range result according to the value of K;
storing the assigned K-types in a second memory means addressed in part by the J-types found in the first memory means and in part by the n-many least significant bits of the applied parameter; and
finding in the second memory means the range result associated with the J-type found above taken in conjunction with the K-portion of that same parameter value.

14. A method for addressing memories to determine a range result indicating if an (n+m)-many bit applied parameter lies within a range or combination of ranges in a plurality of ranges defined upon a value space of m+n bits representing $2^{(m+n)}$ discrete values, comprising the steps of:

representing instances of the $2^{(m+n)}$ discrete values in the form of two digits J and K, where the radix of J is $2^m$ and the radix of K is $2^n$;

dividing an applied parameter into a J portion corresponding to m-many most significant bits and a K portion corresponding to n-many least significant bits;

representing the left and right endpoints of each range R1, R2 ... in the plurality of ranges as the dual plurality of respective JK pairs $J_{L1}$ $K_{L1}$ and $J_{R1}$ $K_{R1}$, $J_{L2}$ $K_{L2}$ and $J_{R2}$ $K_{R2}$, and so forth;

partitioning the $2^m$ values of J into categorical and indeterminate J-groups delimited by $J_{L1}$ and $J_{R1}$, and also by $J_{L2}$ and $J_{R2}$, and so forth, the categorical J-groups being those J-values for which the range result is immediately determined by J without further recourse to the value of K, and the indeterminate J-groups being those J-values for which the value of K matters in determining the range result;

assigning J-types to the J-groups to represent categorical yes's, no's and indeterminate maybe's among the J-groups;

storing the assigned J-types in a first memory means addressed by the m-many most significant bits of the applied parameter;

finding in the first memory means the assigned J-type associated with the J-portion of the applied parameter;

partitioning the $2^n$ values of K into K-groups delimited by $K_{L1}$ and $K_{R1}$, and also by $K_{L2}$ and $K_{R2}$, and so forth;

assigning K-types to the cartesian product of the J-types taken with the K-groups to represent the various possible range results, each element in this cartesian product including a categorical yes J-type being assigned a range result indicating that the parameter value lies within an associated range, each element including a categorical no J-type producing a range result indicating that the parameter value lies outside an associated range, and each element including an indeterminate J-type producing an appropriate range result according to the value of K;

storing the assigned K-types in a second memory means addressed in part by the J-types found in the first memory means and in part by the n-many least significant bits of the applied parameter;

finding in the second memory means the range result associated with the J-type found above taken in conjunction with the K-portion of that same parameter value.

15. A method as in claim 14 wherein the step of finding the range result produces an indication having a separate bit for each of the ranges in the plurality and wherein those separate bits independently indicate whether or not the parameter value lies within the associated range.

16. A method as in claim 14 wherein the step of finding the range result produces an indication having fewer bits than a maximum number of ranges and wherein those bits are encoded to represent the particular range or combination of ranges the parameter value lies within.

17. A method of adressing memories to determine a range result indicating if a parameter value lies within a range defined upon a value space of l+m+n bits representing $2^{(l+m+n)}$ discrete values, comprising the steps of:

representing instances of the $2^{(l+m+n)}$ discrete values in the form of three digits I, J and K, where the radix of I is $2^l$, the radix of J is $2^m$ and the radix of K is $2^n$;

representing the left and right endpoints of the range as the IJK triples $I_L$ $J_L$ $K_L$ and $I_R$ $J_R$ $K_R$, respectively;

partitioning the $2^l$ values of I into categorical and indeterminate I-groups delimited by $I_L$ and $I_R$, the categorical I-groups being those I-values for which the range result is immediately determined by I without further recourse to the values of J and K, and the indeterminate I-groups being those I-values for which the value of at least one of J or K matter in determining the range result;

assigning I-types to the I-groups to represent categorical yes's, no's and indeterminate maybe's among the I-groups;

finding the assigned I-type associated with the I-portion of a paramter value;

partitioning the $2^m$ values of J into categorical and indeterminate J-groups delimited by $J_L$ and $J_R$, the categorical J-groups being those J-values for which the range result is determined without recourse to the value of K, and the indeterminate J-groups being those J-values for which the value of K matters in determining the range result;

assigning J-types to the cartesian product of the I-types taken with the J-groups to represent categorical yes's, no's and indeterminate maybe's among the J-groups, each element of this cartesian product including a categorical yes I-type being assigned a categorical yes J-type, each element including a categorical no I-type being assigned a categorical no J-type, and each element including an indeterminate I-type being assigned a categorical or indeterminate J-type according to the value of J;

finding the assigned J-type associated with the I-type found above taken in conjunction with the J-portion of that same parameter value;

partitioning the $2^n$ values of K into K-groups delimited by $K_L$ and $K_R$;

assigning K-types to the cartesian product of the J-types taken with the K-groups to represent the various possible range results, each element of this cartesian product including a categorical yes J-type being assigned a range result indicating that the parameter value lies within the range, each element including a categorical no J-type being assigned a range result indicating that the parameter value lies outside the range, and each element including an indeterminate J-type being assigned an appropriate range result according to the value of K; and finding the range result associated with the J-type found above taken in conjunction with the K-portion of that same parameter value.

18. A method of addressing memories to determine a range result indicating if a parameter value lies within a range or combination of ranges in a plurality of ranges defined upon a value space of $l+m+n$ bits representing $2^{(l+m+n)}$ discrete values, comprising the steps of:

representing instances of the $2^{(l+m+n)}$ discrete values in the form of three digits I, J and K, where the radix of I is $2^l$, the radix of J is $2^m$ and the radix of K is $2^n$;

representing the left and right endpoints of each range R1, R2 . . . in the plurality of ranges as the dual plurality of respective IJK triples $I_{L1} J_{L1} K_{L1}$ and $I_{R1} J_{R1} K_{R1}$, $I_{L2} J_{L2} K_{L2}$ and $I_{R2} J_{R2} K_{R2}$, and so forth;

partitioning the $2^l$ values of I into categorical and indeterminate I-groups delimited by $I_{L1}$ and $I_{R1}$, and also by $I_{L2}$ and $I_{R2}$, and so forth, the categorical I-groups being those I-values for which the range result is immediately determined by I without further recourse to the values of J and K, and the indeterminate I-groups being those I-values for which the value of at least one of J or K matter in determining the range result;

assigning I-types to the I-groups to represent categorical yes's, no's and indeterminate maybe's among the I-groups;

finding the assigned I-type associated with the I-portion of a parameter value;

partitioning the $2^m$ values of J into categorical and indeterminate J-groups delimited by $J_{L1}$ and $J_{R1}$, and also by $J_{L2}$ and $J_{R2}$, and so forth, the categorical J-groups being those J-values for which the range result is determined without recourse to the value of K, and the indeterminate J-groups being those J-values for which the value of K matters in determining the range result;

assigning J-types to the cartesian product of the I-types taken with the J-groups to represent categorical yes's, no's and indeterminate maybe's among the J-groups, each element in this cartesian product including a categorical yes I-type being assigned a categorical yes J-type, each element including a categorical no I-type being assigned a categorical no J-type, and each element including an indeterminate I-type being assigned a categorical or indeterminate J-type according to the value of J;

finding the assigned J-type associated with the I-type found above taken in conjunction with the J-portion of that same parameter value;

partitioning the $2^n$ values of K into K-groups delimited by $K_{L1}$ and $K_{R1}$, and also by $K_{L2}$ and $K_{R2}$, and so forth;

assigning K-types to the cartesian product of the J-types found above taken with the K-groups to represent the various possible range results, each element in this cartesian product including a categorical yes J-type being assigned a range result indicating that the parameter value lies within an associated range, each element including a categorical no J-type being assigned a range result indicating that the parameter value lies outside an associated range, and an indeterminate J-type being assigned an appropriate range result according to the value of K; and finding the range associated with the J-type found above taken in conjunction with the K-portion of that same parameter value.

19. A method as claim 18 wherein the step of finding the range result produces an indication having a separate bit for each of the ranges in the plurality and wherein those separate bits independently indicate whether or not the parameter value lies within the associated range.

20. A method as in claim 18 wherein the step of finding the range result produces an indication having fewer bits than a maximum number of ranges and wherein those bits are encoded to represent the particular range or combination of ranges the parameter value lies within.

* * * * *